United States Patent
Schlosser et al.

(10) Patent No.: US 7,628,084 B2
(45) Date of Patent: Dec. 8, 2009

(54) COMPENSATION METHOD AND APPARATUS FOR A CORIOLIS FLOW METER

(75) Inventors: Martin Andrew Schlosser, Boulder, CO (US); Joseph C. Dille, Telford, PA (US); Jeffrey L. Whiteley, Perkasie, PA (US)

(73) Assignee: Emerson Electric Co., St. Louis, MO (US)

( * ) Notice: Subject to any disclaimer, the term of this patent is extended or adjusted under 35 U.S.C. 154(b) by 262 days.

(21) Appl. No.: 11/575,376

(22) PCT Filed: Sep. 17, 2004

(86) PCT No.: PCT/US2004/030492

§ 371 (c)(1),
(2), (4) Date: Mar. 15, 2007

(87) PCT Pub. No.: WO2006/041427

PCT Pub. Date: Apr. 20, 2006

(65) Prior Publication Data

US 2007/0245832 A1   Oct. 25, 2007

(51) Int. Cl.
*G01F 1/84* (2006.01)

(52) U.S. Cl. .................. 73/861.355; 73/861.356; 73/861.357

(58) Field of Classification Search ............ 73/861.355, 73/861.356, 861.357
See application file for complete search history.

(56) References Cited

U.S. PATENT DOCUMENTS

| 4,768,384 | A |   | 9/1988  | Flecken et al.          |
|-----------|---|---|---------|-------------------------|
| 5,373,745 | A | * | 12/1994 | Cage ............... 73/861.356 |
| 5,497,665 | A | * | 3/1996  | Cage et al. ......... 73/861.356 |
| 5,728,952 | A | * | 3/1998  | Yao et al. ........... 73/861.357 |
| 5,734,112 | A | * | 3/1998  | Bose et al. ........... 73/861.56 |
| 5,827,979 | A |   | 10/1998 | Schott et al.           |
| 5,831,178 | A | * | 11/1998 | Yoshimura et al. ..... 73/861.357 |
| 6,502,466 | B1 |   | 1/2003 | Cage et al.             |

FOREIGN PATENT DOCUMENTS

| EP | 0701107 A | 3/1996 |
| RU | 2235295 C2 | 8/2004 |
| WO | WO 00/71979 A | 11/2000 |

\* cited by examiner

*Primary Examiner*—Andre J Allen
(74) *Attorney, Agent, or Firm*—The Ollila Law Group LLC

(57) ABSTRACT

Method and apparatus (121) for providing temperature flow rate compensation for a Coriolis flow meter. The described compensation compensates both flow calibration factor and the nominal time delay, commonly called "zero" in the art. After a Coriolis flow meter is installed into a process, whether for calibration or for actual process use, it need only be zeroed once over its lifetime following its installation. This is a significant improvement over prior Coriolis flow meters that may need to be re-zeroed after minor changes in pressure, temperature, or installation.

70 Claims, 13 Drawing Sheets

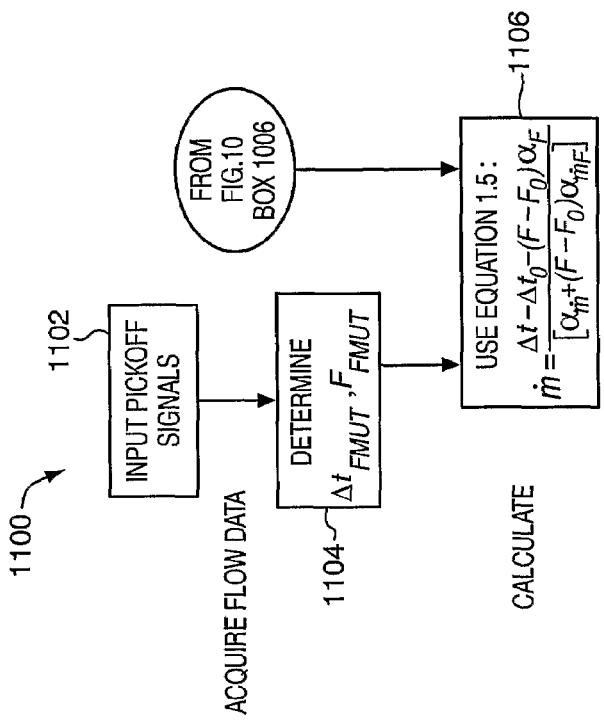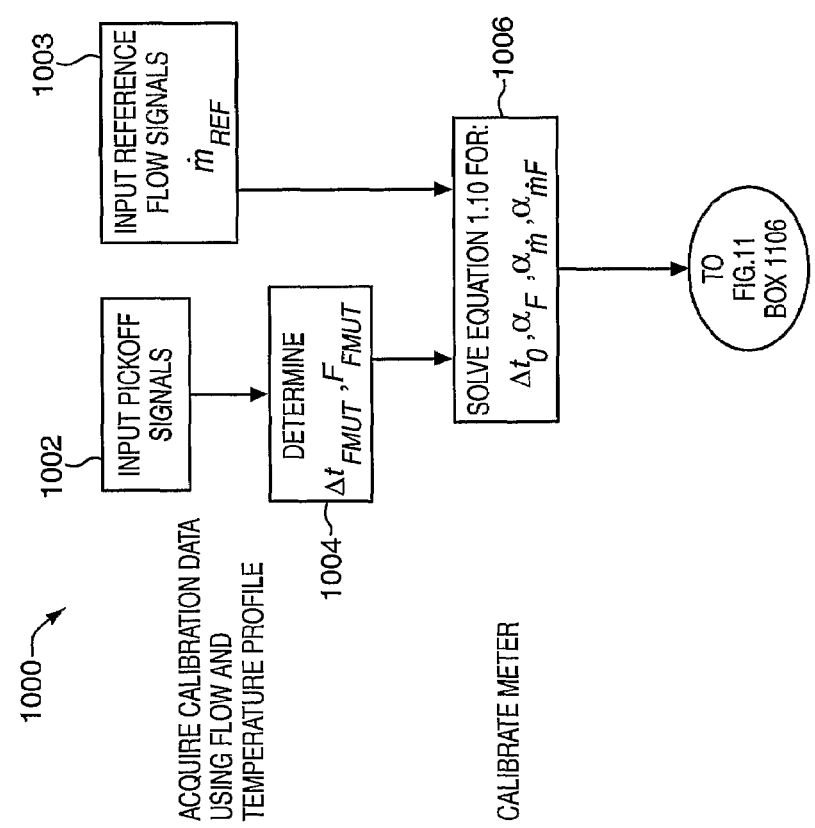

FIG. 12

$$\begin{bmatrix} \Delta t_0 \\ \alpha_F \\ \alpha_{\dot{m}} \\ \alpha_{\dot{m}F} \end{bmatrix}_{FMUT}^{4x1} = PINV\left(\begin{bmatrix} 1 & (F-F_0)_{FMUT} & \dot{m}_{REF} & \dot{m}_{REF}(F-F_0)_{FMUT} \end{bmatrix}\right) \Delta t_{FMUT}$$

= PINV $$\left( \begin{bmatrix} \{1 \cdots 1\}^{Run1}_{Mx1} \\ \{1 \cdots 1\}^{Run2}_{Mx1} \\ \{1 \cdots 1\}^{Run3}_{Mx1} \\ \{1 \cdots 1\}^{Run4}_{Mx1} \end{bmatrix}_{4Mx1} \begin{bmatrix} \{(F_1-F_0) \cdots (F_M-F_0)\}^{Run1}_{Mx1} \\ \{(F_1-F_0) \cdots (F_M-F_0)\}^{Run2}_{Mx1} \\ \{(F_1-F_0) \cdots (F_M-F_0)\}^{Run3}_{Mx1} \\ \{(F_1-F_0) \cdots (F_M-F_0)\}^{Run4}_{Mx1} \end{bmatrix}_{4Mx1} \begin{bmatrix} \{\dot{m}_1 \cdots \dot{m}_M\}^{Run1}_{Mx1} \\ \{\dot{m}_1 \cdots \dot{m}_M\}^{Run2}_{Mx1} \\ \{\dot{m}_1 \cdots \dot{m}_M\}^{Run3}_{Mx1} \\ \{\dot{m}_1 \cdots \dot{m}_M\}^{Run4}_{Mx1} \end{bmatrix}_{4Mx1} \begin{bmatrix} \{\dot{m}_1(F_1-F_0) \cdots \dot{m}_M(F_M-F_0)\}^{Run1}_{Mx1} \\ \{\dot{m}_1(F_1-F_0) \cdots \dot{m}_M(F_M-F_0)\}^{Run2}_{Mx1} \\ \{\dot{m}_1(F_1-F_0) \cdots \dot{m}_M(F_M-F_0)\}^{Run3}_{Mx1} \\ \{\dot{m}_1(F_1-F_0) \cdots \dot{m}_M(F_M-F_0)\}^{Run4}_{Mx1} \end{bmatrix}_{4Mx1} \right)_{4x4M}^{4M=4}$$

$$\begin{bmatrix} \{\Delta t_1 \cdots \Delta t_M\}^{Run1}_{Mx1} \\ \{\Delta t_1 \cdots \Delta t_M\}^{Run2}_{Mx1} \\ \{\Delta t_1 \cdots \Delta t_M\}^{Run3}_{Mx1} \\ \{\Delta t_1 \cdots \Delta t_M\}^{Run4}_{Mx1} \end{bmatrix}_{4Mx1}$$

Columns (left to right): 1's, Frequency of FMUT, Mass Flow of Reference, Mass Flow of Reference × Frequency of FMUT; RHS: Delta-t measured by pickoffs of FMUT.

1201

COMPENSATION METHOD AND APPARATUS FOR A CORIOLIS FLOW METER

RELATED APPLIACTIONS

This is a National Stage entry of International Application No. PCT/US04/30492, with an international filing date of Sep. 17, 2004, the disclosure of which is hereby incorporated by reference.

FIELD OF THE INVENTION

This invention relates to a compensation method and apparatus for a Coriolis flow meter.

Problem

It is known to use Coriolis effect mass flow meters to measure mass flow and other information of materials flowing through a pipeline as disclosed in U.S. Pat. No. 4,491,025 issued to J. E. Smith, et al. of Jan. 1, 1985 and Re. 31,450 to J. E. Smith of Feb. 11, 1982. Coriolis flow meters have one or more flow tubes, each having a set of natural vibration modes which may be of a simple bending, torsional, or twisting type. Each material filled flow tube is driven to oscillate at resonance in one of these natural modes. The natural vibration modes are defined in part by the combined mass of the flow tubes and the material within the flow tubes. Material flows into the flow meter from a connected pipeline on the inlet side. The material is then directed through the flow tube or flow tubes and delivered to a pipeline connected on the outlet side.

A driver applies force to oscillate the flow tube. When there is no flow through the Coriolis flow meter, all points along a flow tube oscillate with an identical phase. As the material begins to flow, Coriolis accelerations cause each point along the flow tube to have a different phase with respect to other points along the flow tube. The phase on the inlet side of the flow tube lags the driver; the phase on the outlet side leads the driver. Pick-off sensors on the flow tube produce sinusoidal signals representative of the motion of the flow tube. The phase difference between the two sensor signals is proportional to the mass flow rate of the material flowing through the flow tube or flow tubes.

It is known to use Coriolis flow meters having different flow tube configurations. Among these configurations are single tube, dual tubes, straight tube, curved tube, and flow tubes of irregular configuration. Most Coriolis flow meters are made of metal such as aluminum, steel, stainless steel and titanium. Glass flow tubes are also known. Most straight serial path Coriolis flow meters currently in the art are made out of metal, particularly Titanium.

It is known that as operational factors change, the characteristics of the Coriolis flow meter may be affected. These factors may be internal effects such as drift in electronic components associated with the Coriolis flow meter's transmitter or they can be external effects such as fluctuations in line pressure, density, viscosity, or changes in ambient temperature and drive frequency of the Coriolis flow meter. Much of the prior art has focused on compensating for these changes by upgrading or modifying circuit schemes or by making adjustments to the flow calibration factor. Examples of these methods are shown in U.S. Pat. No. 5,231,884 by Zolock and U.S. patent application Ser. No. 09/343,836 by Van Cleve et al.

Coriolis flow meters can be operated under controlled conditions in which pressure, density, and viscosity are maintained constant to eliminate the complexities of compensating for fluctuations in these parameters. However, this is not always feasible since it is often difficult to prevent fluctuations in the temperature of the process material or of the environment in which the Coriolis flow meter is operated. When pressure, density and viscosity can be held constant, temperature compensation of a Coriolis flow meter can be accomplished using a thermal sensor (commonly referred to as RTD) affixed to one or more portions of the Coriolis flow meter. The RTD measures the operating temperature of the flow meter portion to which it is affixed. The RTD information and drive frequency information is applied to meter electronics which generates a temperature compensated mass flow rate output. Flow tube pick-off signals generate an uncompensated mass flow signal which is applied to the meter electronics which alters the uncompensated received mass flow rate signal to produce a drive frequency compensated mass flow out put signal.

There are disadvantages associated with the use of RTD thermal sensors for temperature compensation. The first disadvantage is that the thermal sensor cannot be attached to the vibrating portion of the flow tube since the added weight of the sensor would alter the vibrational characteristics of the flow tube and degrade the accuracy of the output signal. The thermal sensor must therefore be attached elsewhere to the Coriolis flow meter or on the input or output line of the Coriolis flow meter. Because of this, the thermal sensor cannot be used to directly measure the temperature of the process material within the vibrating portion of the flow tube. Since accurate temperature compensation requires that the temperature of the material within the active portion of the flow tube be measured, the use of other mounting locations, such as those on the input or output line of the flow meter, results in a temperature that is different from the desired temperature. This causes inaccuracies in the temperature compensated flow rate output signal generated by the meter electronics.

A second disadvantage of the use of thermal sensors is that, since they are not mounted on the active portion of the vibrating flow tube, there is an inherent time difference between the time the thermal sensor detects a thermal change and the time the temperature of the flow tube material changes. This time difference results in further inaccuracies in the compensated mass flow rate output signal generated by the flow meter.

Solution

The present invention solves the above and other problems and achieves an advance in the art by the provision of a method and apparatus for temperature compensation for Coriolis flow meters which avoids the use of thermal sensors. The method and apparatus of the present invention monitors the drive frequency of the flow tube to provide temperature compensation. The Coriolis flow meter is operated in an environment in which all parameters, except temperature, which have an effect on the flow tube frequency, are held constant. These factors include such as stiffness or calibration factor sensitivity all of which can influence drive frequency. Other such parameters include material density, viscosity, and pressure. Under these controlled circumstances, changes in frequency of vibration must be due to changes in temperature which changes in Young modulus and the vibrating flow tube stiffness.

A Coriolis flow meter designed in accordance with the preferred embodiment of the invention has advantages in the area of compensation. The present invention compensates not only flow calibration but also adjusts the nominal time delay $\Delta t_0$, commonly called "zero" in the art. This means that after a Coriolis flow meter is installed into a process, whether for calibration or for actual process use, it need only be zeroed once after installation. This is a significant improvement over Coriolis flow meters that may need to be re-zeroed after minor changes in pressure or temperature.

At the time of meter calibration the temperature effect on the flow tube is characterized by monitoring frequency and temperature changes as the material flow and actual temperature are varied. The calibration constants used to compensate flow are then determined and stored in the meter electronics. During operation, the material flow and the frequency of vibration of the flow tube are monitored. The resulting temperature changes and frequency information from the meter are applied to meter electronics which uses the stored calibration constants to calculate a temperature compensated mass flow rate $\dot{m}$.

The use of flow tube frequency for producing a temperature compensated mass flow is advantageous over the use of thermal sensors since changes in frequency are detected to produce a change in the compensated mass flow rate signal immediately upon the detection of the frequency change. The instantaneous change in flow tube frequency is applied to the meter electronics which generates a corrected compensated mass flow rate signal of increased accuracy corresponding to the change in flow tube temperature.

One aspect of the invention includes a method for providing thermal compensation for a Coriolis flow meter having at least one flow tube; said method comprising the steps of:

generating a first signal representing Coriolis deflections of said flow tube;

generating a second signal representing characteristics of said flow meter, wherein said characteristics include the drive frequency F of said Coriolis flow meter as well as an induced time delay $\Delta t$; and characterized by the provision of meter electronics for using said first and said second signals to provide thermal compensation for said output signals of said Coriolis flow meter.

Preferably, the method further comprises said step of providing thermal compensation including the steps of:

receiving a calibrated mass flow rate from a master Coriolis flow meter, and using said first and said second signals and said calibrated mass flow rate to provide said thermal compensation for said Coriolis flow meter.

Preferably, the method further comprises said step of providing thermal compensation includes the steps of:

using said first and said second signals and said calibrated mass flow rate to derive calibration constants for said Coriolis flow meter; and using said calibration constants to provide said thermal compensation for said Coriolis flow meter.

Preferably, the method further comprises the further step of determining a thermally compensated flow rate for said Coriolis flow meter in response to said generation of said first and second signals and said provision of said thermal compensation for said Coriolis flow meter.

Preferably, the method further comprises the further steps of:

receiving a third signal representing calibration constants of said Coriolis flow meter; and using said first and second and said third signals and said calibration constants to determine a thermally compensated flow rate for said Coriolis flow meter.

Preferably, the method further comprises the further steps of:

determining a drive frequency F from said second signal;

deriving a linear frequency calibration constant $\alpha_F$ for zero; and using said drive frequency F and said linear frequency calibration constant $\alpha_F$ for zero to derive said thermally compensated flow rate.

Preferably, the method further comprises compensated mass flow rate including further steps of:

deriving a coefficient $\alpha_m$ for flow; and using said drive frequency F and said linear drive frequency constant $\alpha_F$ for zero, and said constant $\alpha_m$ for flow to derive a thermally compensated flow rate.

Preferably, the method further comprises the further steps of:

deriving a linear frequency (temp) constant $\alpha_{mF}$ for flow; and using said drive frequency F and said linear drive frequency constant $\alpha_F$ for zero and said constant $\alpha_m$ for flow and said linear frequency (temp) constant $\alpha_{mF}$ for flow to derive a thermally compensated mass flow rate.

Preferably, the method further comprises said step of deriving said calibration constants comprises the step of:

receiving a mass flow rate $\dot{m}$ from a master Coriolis flow meter; and using said received mass flow rate $\dot{m}$ and said second signal for deriving said calibration constants of said Coriolis flow meter.

Preferably, the method further comprises said step of generating said calibration constants comprises the further steps of:

receiving said second signal to derive a flow induced time delay $\Delta t$ and said drive frequency F of the Coriolis flow meter; and using said first signal and said flow induced time delay $\Delta t$ and said drive frequency F for deriving said calibration constants of said Coriolis flow meter.

Preferably, the method further comprises said step of generating said calibration constants comprises the further steps of:

deriving a linear drive frequency constant $\alpha_F$ for a nominal time delay $\Delta t_0$; and;

using said drive frequency F, and said linear drive frequency constant $\alpha_F$ for said nominal time delay $\Delta t_0$ to derive said calibration constants.

Preferably, the method further comprises said calibration constants are:

$\Delta t_0, \alpha_F, \alpha_m, \alpha_{mF}$

Preferably, the method further comprises said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([\,1 \quad (F - F_0) \quad \dot{m} \quad \dot{m}(F - F_0)\,])\Delta t \qquad 1.10$$

Where
$\Delta t$ Flow induced time delay
$\Delta t_0$ Nominal time delay
$\dot{m}$ Mass Flow Rate
F Drive Frequency
Fo Drive Frequency—nominal zero flow
$\alpha_F$ Linear Frequency constant for zero $\alpha_m$ Coefficient related to FCF
$\alpha_{mF}$ Linear frequency (temp) constant Preferably, the method further comprises said step of determining said thermally compensated mass flow rate comprises the step of solving the expression:

$$\dot{m} = \frac{\Delta t - \Delta t_0 - (F - F_0)\alpha_F}{[\alpha_{\dot{m}} + (F - F_0)\alpha_{\dot{m}F}]} \qquad 1.5$$

Where:
$\Delta t$ Flow induced time delay
$\Delta t_0$ Nominal time delay
$\dot{m}$ Mass Flow Rate
F Drive Frequency
$F_0$ zero drive frequency
$\alpha_F$ Linear Frequency constant for zero
$\alpha_m$ constant related to FCF
$\alpha_{mF}$ Linear FCF frequency (temp) constant Another aspect of the invention comprises an apparatus that provides thermal compensation for a Coriolis flow meter having at least one flow tube; said apparatus comprises:

apparatus that generates a first signal representing Coriolis deflections of said flow tube;

apparatus that generates a second signal representing characteristics of said flow meter, wherein said characteristics include the drive frequency F of said Coriolis flow meter as well as an induced time delay $\Delta t$; and characterized by the provision of meter electronics that uses said first and said second signals to provide thermal compensation for output signals of said Coriolis flow meter.

Preferably, said apparatus that provides thermal compensation includes:

apparatus that receives a calibrated mass flow rate from a master Coriolis flow meter, and apparatus that uses said first and said second signals and said calibrated mass flow rate to provide said thermal compensation for said Coriolis flow meter.

Preferably, said apparatus that provides said thermal compensation further includes:

apparatus that uses said first and said second signals and said calibrated mass flow rate to derive calibration constants for said Coriolis flow meter; and apparatus that uses said calibration constants and said first and said second signals and said calibrated mass flow rate to provide said thermal compensation for said Coriolis flow meter.

Preferably, apparatus that determines a thermally compensated flow rate for said Coriolis flow meter in response to said generation of said first and second signals and said provision of said thermal compensation for said Coriolis flow meter.

Preferably, apparatus that receives a third signal representing calibration constants of said Coriolis flow meter; and apparatus that uses said first and said second and said third signals and said calibration constants to determine a thermally compensated flow rate for said Coriolis flow meter.

Preferably, apparatus that determines a drive frequency F from said second signal;

apparatus that derives a linear frequency calibration constant $\alpha_F$ for zero;

apparatus that derives a coefficient $\alpha_m$ for flow;

apparatus that derives a linear frequency (temp) constant $\alpha_{mF}$ for flow; and apparatus that uses said drive frequency F and said linear drive frequency constant $\alpha_F$ for zero and said constant $\alpha_m$ for flow and said linear frequency (temp) constant $\alpha_{mF}$ for flow to derive a thermally compensated mass flow rate.

Preferably, said apparatus that derives said calibration constants comprises:

apparatus that receives a mass flow rate $\dot{m}$ from a master Coriolis flow meter;

apparatus that receives said second signal to derive a flow induced time delay $\Delta t$ and said drive frequency F of the Coriolis flow meter;

apparatus that derives a linear drive frequency constant $\alpha_F$ for a nominal time delay $\Delta t_0$; and apparatus that uses said drive frequency F, and said linear drive frequency constant $\alpha_F$ for said nominal time delay $\Delta t_0$ and said mass flow rate $\dot{m}$ to derive said calibration constants.

Preferably, said calibration constants are:

$\Delta t_0, \alpha_F, \alpha_m, \alpha_{mF}$

Preferably, said apparatus that derives said calibration constants includes apparatus that solves the expression:

$$\begin{bmatrix} \Delta t_0 \\ \alpha_F \\ \alpha_{\dot{m}} \\ \alpha_{\dot{m}F} \end{bmatrix} = pinv([1 \quad (F - F_0) \quad \dot{m} \quad \dot{m}(F - F_0)])\Delta t \qquad 1.10$$

Where
$\Delta t$ Flow induced time delay
$\Delta t_0$ Nominal time delay
$\dot{m}$ Mass Flow Rate
F Drive Frequency
Fo Drive Frequency—nominal zero flow
$\alpha_F$ Linear Frequency constant for zero
$\alpha_m$ Coefficient related to FCF
$\alpha_{mF}$ Linear frequency (temp) constant Preferably, said apparatus that derives said thermally compensated mass flow rate solves the expression $$\dot{m} = \frac{\Delta t - \Delta t_0 - (F - F_0)\alpha_F}{[\alpha_{\dot{m}} + (F - F_0)\alpha_{\dot{m}F}]} \qquad 1.5$$

Where:
$\Delta t$ Flow induced time delay
$\Delta t_0$ Nominal time delay
$\dot{m}$ Mass Flow Rate
F Drive Frequency
$\alpha_F$ Linear Frequency constant for zero
$\alpha_m$ constant related to FCF
$\alpha_{mF}$ Linear FCF frequency (temp) constant

DESCRIPTION OF THE DRAWINGS

These and other advantages and features of the present invention may be better understood in connection with a reading of the following detailed description thereof in connection of the drawings in which:

FIGS. 10-11 are flow charts of the method used to calibrate the Coriolis flow meter and to determine mass flow rate $\dot{m}$.

FIG. 12 illustrates the derivation of the calibration constants.

DETAILED DESCRIPTION

Nomenclature

FCF Prior Art Flow Calibration Factor
$\alpha$ Prior Art FCF temperature coefficient
$\Delta t$ Flow induced time delay
$\Delta t_0$ Nominal time delay at zero flow
$\dot{m}$ Mass Flow Rate
F Operating Drive Frequency
$F_0$ Nominal Drive Frequency (under normal thermal conditions) as chosen by the manufacturer
ZERO(F) Term describing the effect Frequency has on Nominal Time Delay, $\Delta t_0$. Equal to $\Delta t_0 + (F-F_0)\alpha_F$
$\alpha_F$ Linear Frequency coefficient for zero
$\alpha_m$ Proportionality Coefficient relating $\Delta t$ to mass flow. Similar to FCF in the Prior Art.
$\alpha_{mF}$ Linear frequency (temp) coefficient for $\alpha_m$. Similar to $\alpha$ in the Prior Art.
FMUT Flow meter under test.

Figure 1:
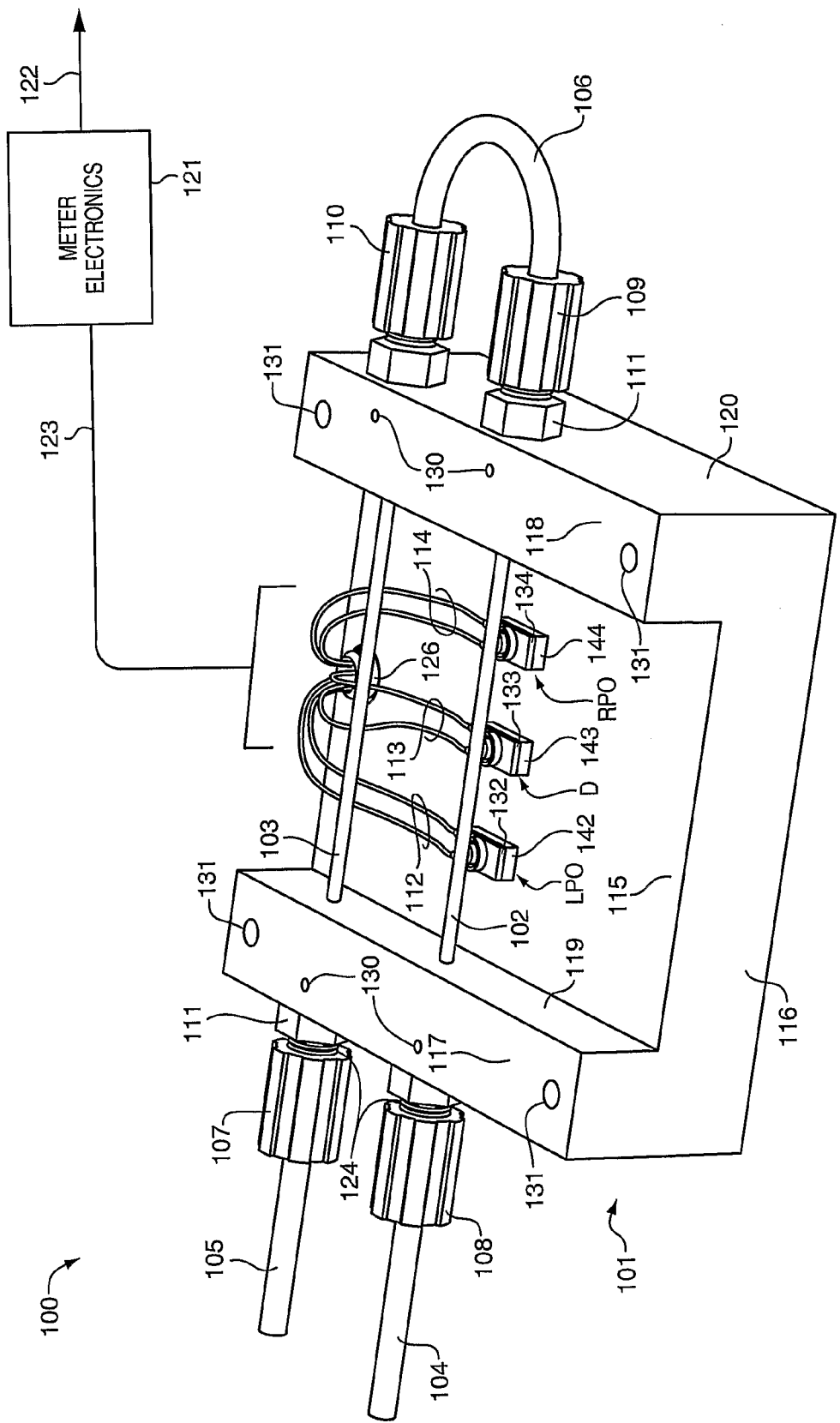
FIG. 1 discloses a perspective view of a first exemplary Coriolis flow meter embodying the invention.

Description of FIG. 1

FIG. 1 is a perspective view of a first possible exemplary embodiment of a Coriolis flow meter embodying the invention. It discloses a flow meter 100 having a flow tube 102 inserted through legs 117, 118 of base 101. Pick-offs LP0 and RP0 and driver D are coupled to flow tube 102. Flow meter 100 receives a process material flow from supply tube 104 and extends the flow through process connection 108 to flow tube 102. Flow tube 102 is vibrated at its resonant frequency with material flow by driver D. The resulting Coriolis deflections are detected by pick-offs LP0 and RP00 which apply signals over conductors 112 and 114 to Coriolis flow meter electronics 121. Coriolis flow meter electronics 121 receives the pick-off signals, determines the phase difference between, determines the frequency of oscillation and applies output information pertaining to the material flow over output path 122 to a utilization circuit not shown. Meter electronics 121 is shown in further detail on FIG. 15.

The material flow passes from flow tube 102 and through tube 106 which redirects the material flow through return tube 103 through process connection 107 to exit tube 105 which delivers the material flow to a user application.

Figure 4:
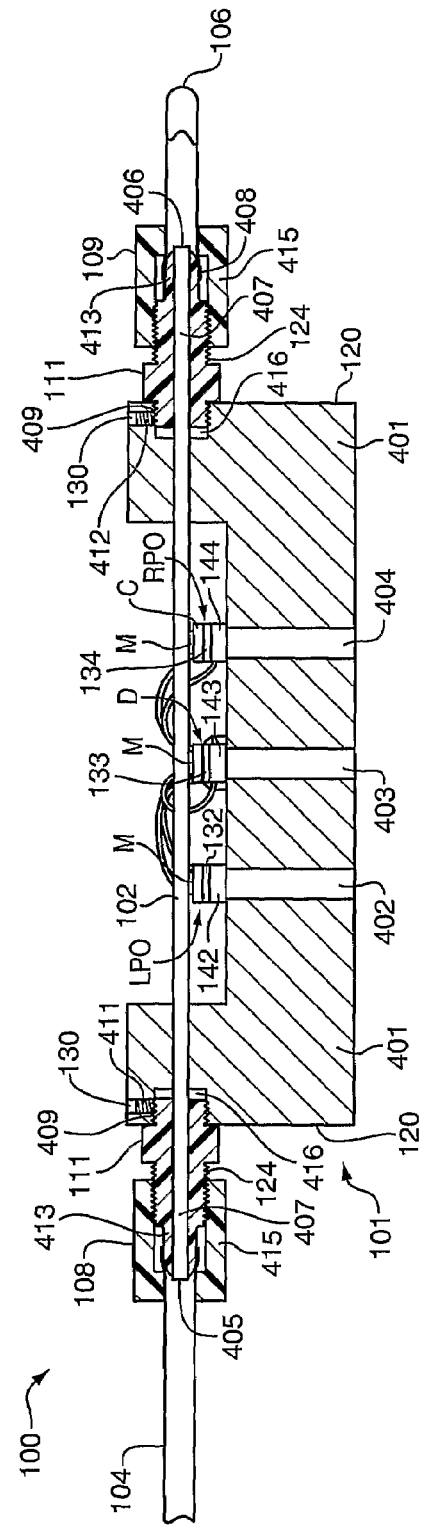
FIG. 4 is a cross-sectional view taken along lines 4-4 of FIG. 2.

Process connections 107, 108, 109 and 110 connect tubes 104, 105 and 106 to the ends of flow tube 102 and return tube. The process connections have a fixed portion 111 that includes threads 124. Locking holes 130 receive set screws 411 to fixably connect element 111 to base 101 as shown in FIG. 4. The movable portion of process connections 107 through 110 are threaded onto male threads 124 to connect their respective tubes to the fixed body of the process connection of which the hexagonal nut portion 111 is a part. These process connections function in a manner similar to the well known copper tubing flared process connections to connect tubes 104, 105 and 106 to ends of flow tube 102 and return tube 103. Details regarding the process connections are further shown in FIG. 4.

Figure 2:
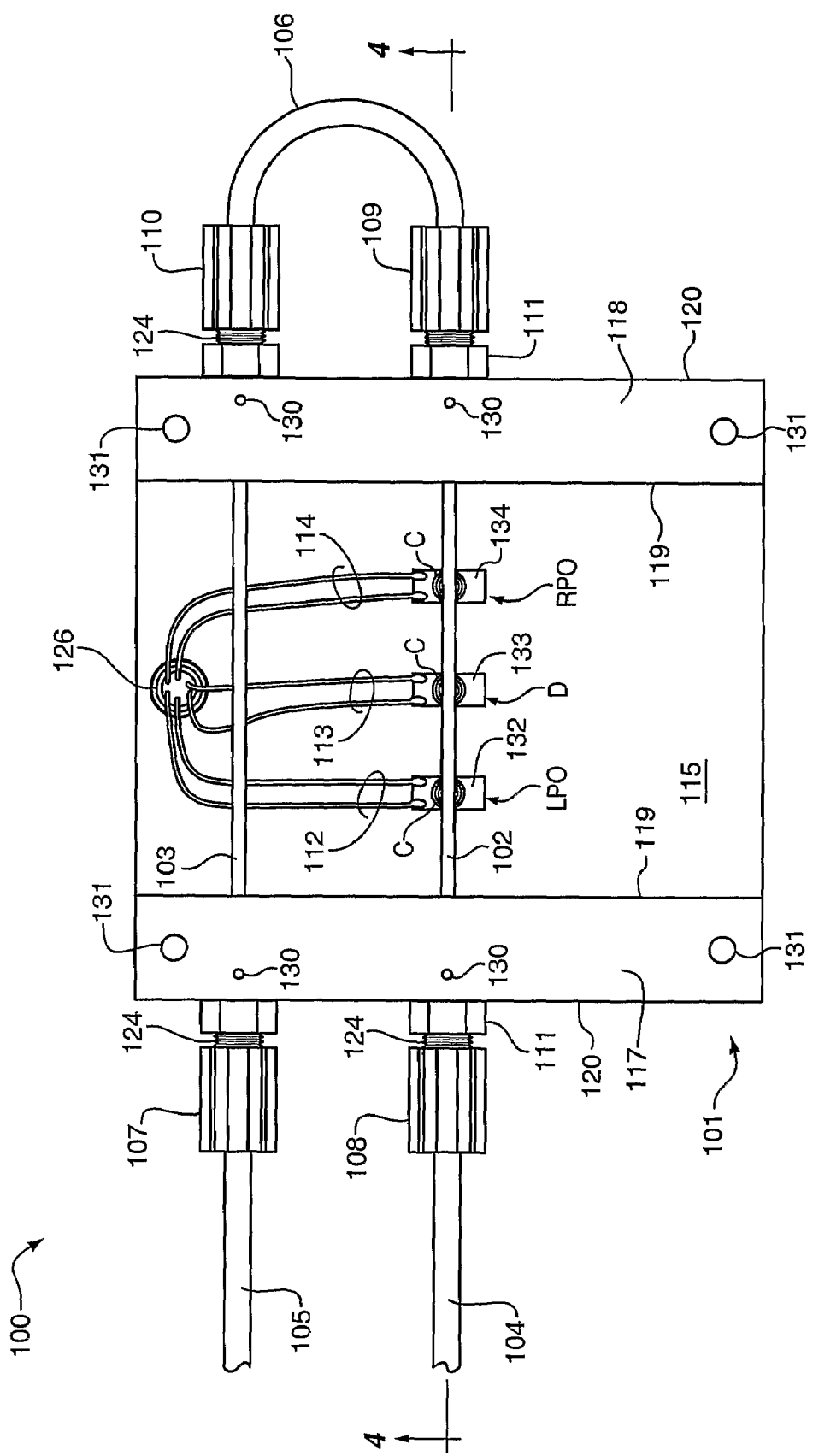
FIG. 2 is a top view of the embodiment of FIG. 1.

Description of FIG. 2

Figure 3:
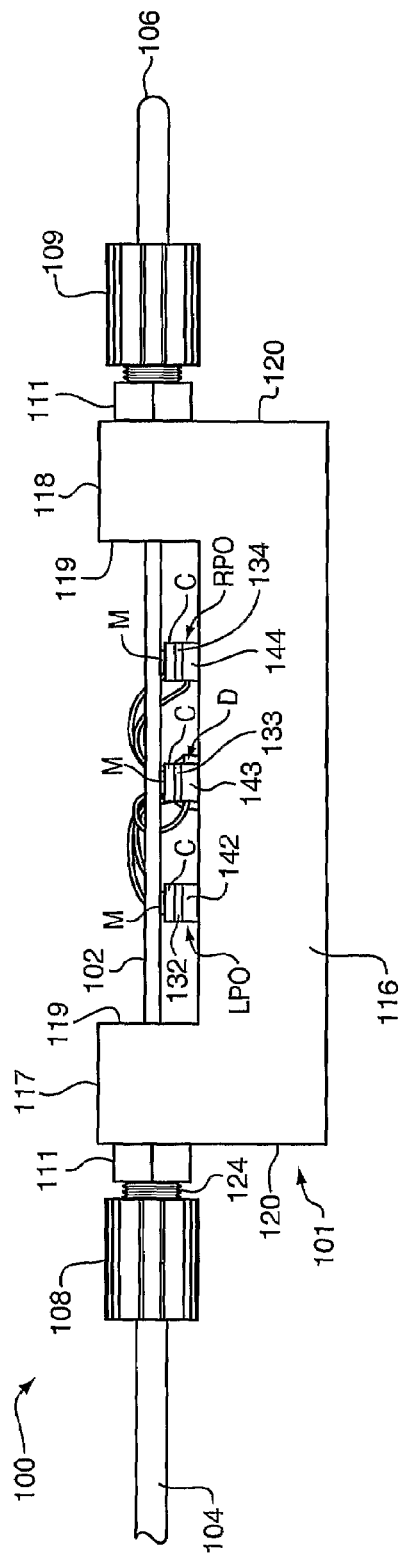
FIG. 3 is a front view of the embodiment of FIG. 1.

In FIG. 2 is a top view of flow meter 100 of FIG. 1. Pick-offs LP0 and RP0 and driver D each include a coil C. Each of these elements further includes a magnet which is affixed to the bottom portion of flow tube 102 as shown in FIG. 3. Each of these elements further includes a base, such as 143 for driver D, as well as a thin strip of material, such as 133 for driver D. The thin strip of material may comprise a printed wiring board to which coil C and its winding terminals are affixed. Pick-offs LP0 and RP0 also have a corresponding base element and a thin strip fixed to the top of the base element. This arrangement facilitates the mounting of a driver or a pick-off to be accomplished by the steps of gluing a magnet M to the underside of flow tube, gluing the coil C to a printed wiring board 133 (for driver D), positioning the opening in coil C around the magnet M, moving the coil C upwardly so that the magnet M fully enters the opening in coil C, then positioning base element 143 underneath the printed wiring board 133 and gluing these elements together so that the bottom of base 143 is affixed by glue to the surface of the massive base 116.

The male threads 124 of process connections 107-110 are shown on FIG. 2. The inner details of each of these elements are shown on FIG. 4. Opening 132 receives conductors 112, 113 and 114. Coriolis flow meter electronics 121 of FIG. 1 is not shown on FIG. 2 to minimize drawing complexity. However it is to be understood that the conductors 112, 113 and 114 extend through opening 132 and further extend over path 123 of FIG. 1 to Coriolis flow meter electronics of FIG. 1.

Description of FIGS. 3 and 4

FIG. 3 shows pick-offs LP0, RP0 and driver D as comprising a magnet M affixed to the bottom portion of flow tube 102 and a coil C affixed to the base of each of elements LP0, RP0 and driver D.

FIG. 4 is a sectional taken along line 4-4 of FIG. 2. FIG. 4 discloses all the elements of FIG. 3 and further details of process connections 108 and 109 and O-rings 430. O-rings 430 couple flow tube 102 to base 401. FIG. 4 further discloses openings 402, 403 and 404 in base 101. The top of each of these openings extends to the lower surface of the base of pick-offs LPO, RPO and driver D. The coil C and magnet M associated with each of these elements is also shown on FIG. 4. Coriolis flow meter electronics 121 of FIG. 1 is not shown on FIGS. 3 and 4 to minimize drawing complexity. Element 405 in process connection 108 is the inlet of flow tube 102; element 406 in process connection 109 is the outlet of flow tube 102.

The fixed portion 111 of process connection 108 includes male threads 409 which screw into mating threads in receiving hole 420 located in base 401 to attach fixed portion 111 to segment 401 of base 101. The fixed portion of process connection 109 on the right is similarly equipped and attached by threads 409 into receiving hole 420 located in element 401 of base 101.

Fixed element 111 of process connection 108 further includes a threaded portion 124 whose threads receive the movable portion 415 of process connection 108. Process connection 109 is similarly equipped. Fixed element 111 of process connection 108 further includes on its left a conical stub 413 which together with movable element 415 acts as a flare fitting to force the right end of input tube 104 over the conical stub 413 of fixed portion 111. This creates a compression fitting that sealably affixes the flared opening of supply tube 104 onto the conical stub portion 413 of fixed portion 111 of the process connection. The inlet of flow tube 102 is positioned in process connection fixed portion 111 and is flush with face 425 of stub 413. By this means, the process material delivered by supply tube 104 is received by inlet 405 of flow tube 102. The process material flows to the right through flow tube 102 to fixed portion 111 of process connection 109 where the outlet 406 of flow tube 102 is flush with face 425 of stub 413. This sealably affixes the outlet of flow tube 102 to connector 109. The other process connections 107 and 110 of FIG. 1 are identical to those described for the details of process connections 108 and 109 on FIG. 4.

General Discussion of FIGS. 5-12

The invention achieves temperature compensation of the mass flow output of a Coriolis flow meter by using drive frequency as an indicator of flow tube temperature change. Coriolis flow meters measure mass flow directly by calculating the time delay ($\Delta t$) between the inlet and outlet ends of the active portion of the vibrating flow tube of the Coriolis flow meter. An offset time delay at zero flow ($\Delta t_0$) is measured and subtracted from the calculated time delay during flow to produce a value that is directly proportional to mass flow via a proportionality constant $\alpha_m$ which is termed calibration factor (FCF) in the prior art.

Fluid density also affects the drive frequency of the flow tube. To understand the sensitivity of frequency to temperature and density, the density effect must be characterized and compared to the temperature effect. The Coriolis flow meter of the present invention may be used with slurries whose specific gravities are quite limited. When frequency is to be used for temperature compensation, the affect of changing fluid density must also be evaluated and determined to determine mass flow.

The flow tube materials respond to changes in temperature. These changes must be considered to accurately calculate mass flow rate. Traditionally, RTD thermal sensors are used to directly measure the temperature. They are positioned on an inactive surface of the Coriolis tube. This is generally done outside of the brace bar(s). The disclosed Coriolis flow meter has a single-straight flow tube. There is no inactive section of the flow tube on which a temperature measurement representative of the flow tube can be made by a thermal sensor positioned on the flow tube without affecting output accuracy.

The present invention detects changes in flow tube temperature by monitoring drive frequency. Using drive frequency in accordance with the present invention to determine temperature changes and compensate for flow output raises the following issues. The prior art measures temperature using an RTD thermal sensor mounted on a secondary or inactive portion of the flow tube and infers the Coriolis flow tube temperature.

The method and apparatus of the present invention improves accuracy of the temperature determination and also improves the meter response time in detecting temperature changes.

When using frequency as a means to detect and compensate for temperature changes, a Taylor Series expansion on $\Delta t$ isolates the effects of frequency and mass flow on $\Delta t$. The expansion is arranged to look like a flow equation and a least-squares pseudo-inverse problem is set up. Assume that the pick-off delay, $\Delta t$, is a function of mass flow and drive frequency.

$$\Delta t = f(\dot{m}, F) \quad \quad 1.1$$

This can be expanded about an operating point with a Taylor Series:

$$\Delta t = f(\dot{m}_0, F_0) + (\dot{m} - \dot{m}_0)\frac{\partial f}{\partial m} + \quad \quad 1.2$$
$$(F - F_0)\frac{\partial f}{\partial F} + \frac{1}{2}(\dot{m} - \dot{m}_0)(F - F_0)\frac{\partial^2 f}{\partial \dot{m} \partial F} + \ldots$$

Equation 1.2 is a full expansion and could be taken out to an infinite number of higher order terms. An optimal fit can be achieved by taking terms that effect zero flow and FCF linearly with temperature and terms that effect zero and FCF quadratically with temperature. However, over the operating temperature of the sensor (18-28 C) of the present invention, behavior is linear enough to use only frequency terms effecting FCF and $\Delta t_0$ linearly. Doing this and re-labeling the partial derivatives one obtains:

$$\Delta t \cong \Delta t_0 + (\dot{m} - \dot{m}_0)\alpha_{\dot{m}} + \underbrace{(F - F_0)\alpha_F}_{\text{zero term linear in frequency}} + \underbrace{(\dot{m} + \dot{m}_0)(F - F_0)\alpha_{\dot{m}F}}_{\text{flow term linear in frequency}} \quad 1.3$$

Now, rearrange the terms by grouping those associated with zero flow and those associated with flow:

$$\Delta t \cong [\Delta t_0 + (F - F_0)\alpha_F] + (\dot{m} - \dot{m})[\alpha_{\dot{m}} + (F - F_0)\alpha_{\dot{m}F}] \quad 1.4$$

For convenience choose nominal $\dot{m}_0 = 0$, equation 1.4 can then be arranged to look like a flow equation:

$$\dot{m} = \frac{\Delta t - \Delta t_0 - (F - F_0)\alpha_F}{[\alpha_{\dot{m}} + (F - F_0)\alpha_{\dot{m}F}]} \quad \quad 1.5$$

A prior art flow equation is:

$$\dot{m} = FCF(1 - \alpha T)(\Delta t - \Delta t_0) \quad \quad 1.6$$

Drawing an analogy between equations 1.5 and 1.6, it can be seen that the portion of equation 1.5 relative to "zero" as a function of frequency is:

$$ZERO(F) = [\Delta t_0 + (F - F_0)\alpha_F] \quad \quad 1.7$$

and the portion of equation 1.5 relating to "flow calibration factor" as a function of frequency is:

$$FCF(F) = \frac{1}{[\alpha_{\dot{m}} + (F - F_0)\alpha_{\dot{m}F}]} \quad \quad 1.8$$

Rewriting equation 1.4 in the form of a vector equation sets up the Least-Squares Pseudo-Inverse problem:

$$\Delta t = \begin{bmatrix} 1 & (F - F_0) & \dot{m} & \dot{m}(F - F_0) \end{bmatrix} \begin{bmatrix} \Delta t_0 \\ \alpha_F \\ \alpha_{\dot{m}} \\ \alpha_{\dot{m}F} \end{bmatrix} \quad 1.9$$

Assuming we can record Δt and drive frequency from the Coriolis flow meter while we record mass flow from a series connected master Coriolis flow meter, we can solve for the column vector in equation 1.4 by multiplying both sides by the pseudo-inverse of the row vector:

$$\begin{bmatrix} \Delta t_0 \\ \alpha_F \\ \alpha_{\dot{m}} \\ \alpha_{\dot{m}F} \end{bmatrix} = pinv([\,1\ \ (F-F_0)\ \ \dot{m}\ \ \dot{m}(F-F_0)\,])\Delta t \quad 1.10$$

Equation 1.10 is the equation we need used by the present invention to optimally characterize the sensor's temperature dependence.

As mentioned earlier, drive frequency has a linear dependence on temperature. Because of this, compensating flow for temperature effects using drive frequency should is advantageous.

Figure 5:
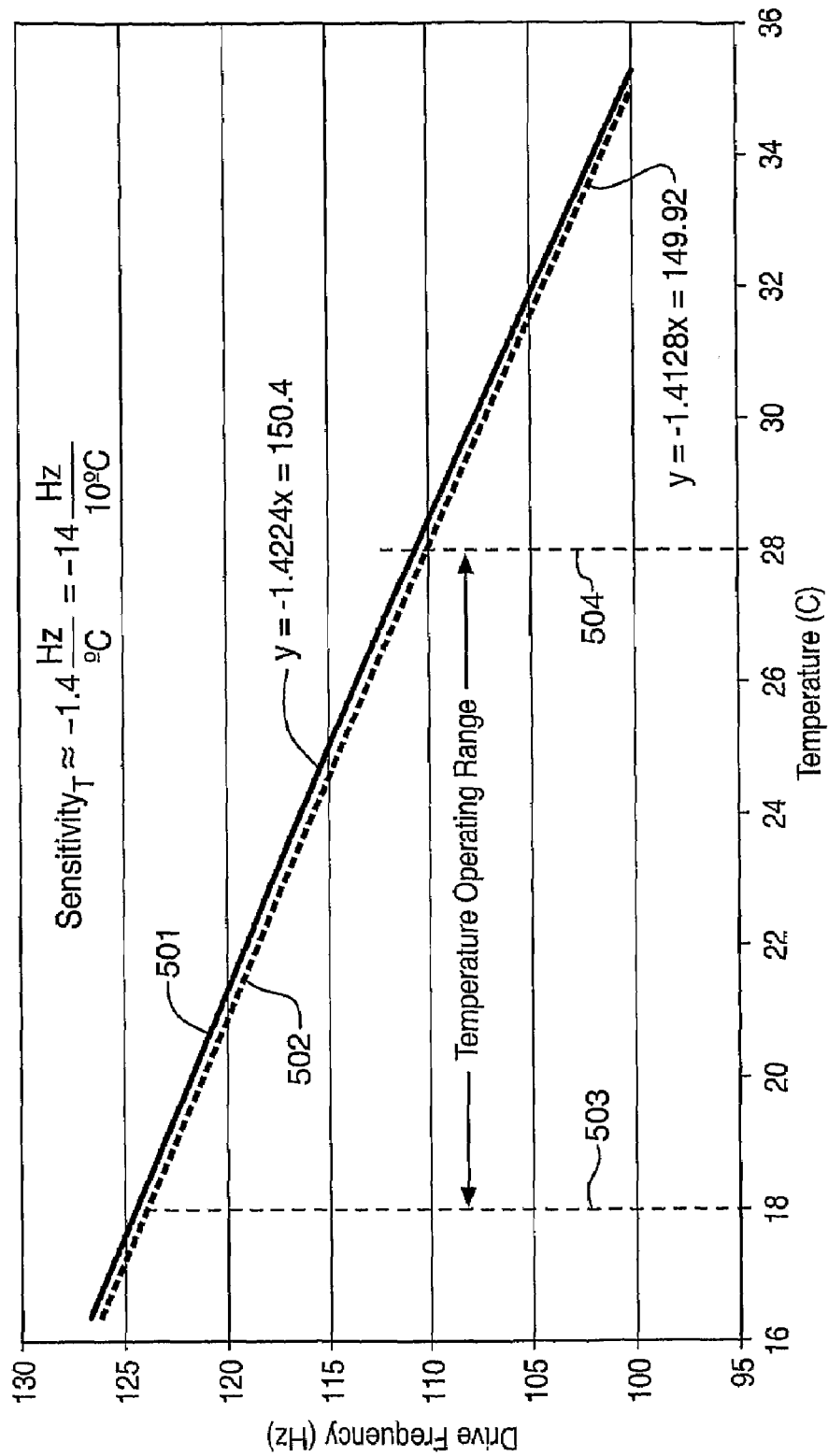
FIG. 5 is a graph showing the relationship between drive frequency and flow tube temperature.

Description of FIG. 5

FIG. 5 illustrates the relationship between drive frequency and temperature for two flow tube sensors on lines 501 and 502. The flow tube sensors were placed in an oven whose temperature was cycled between 15 and 35 C. A linear trend line was fit to each data set of lines 501 and 502 and the specified operating range for the sensor is shown between dotted lines 503 and 504. Using the slope of each trend line 501 and 502, we can estimate the sensitivity of drive frequency as 14 Hz per full scale temperature swing.

Figure 6:
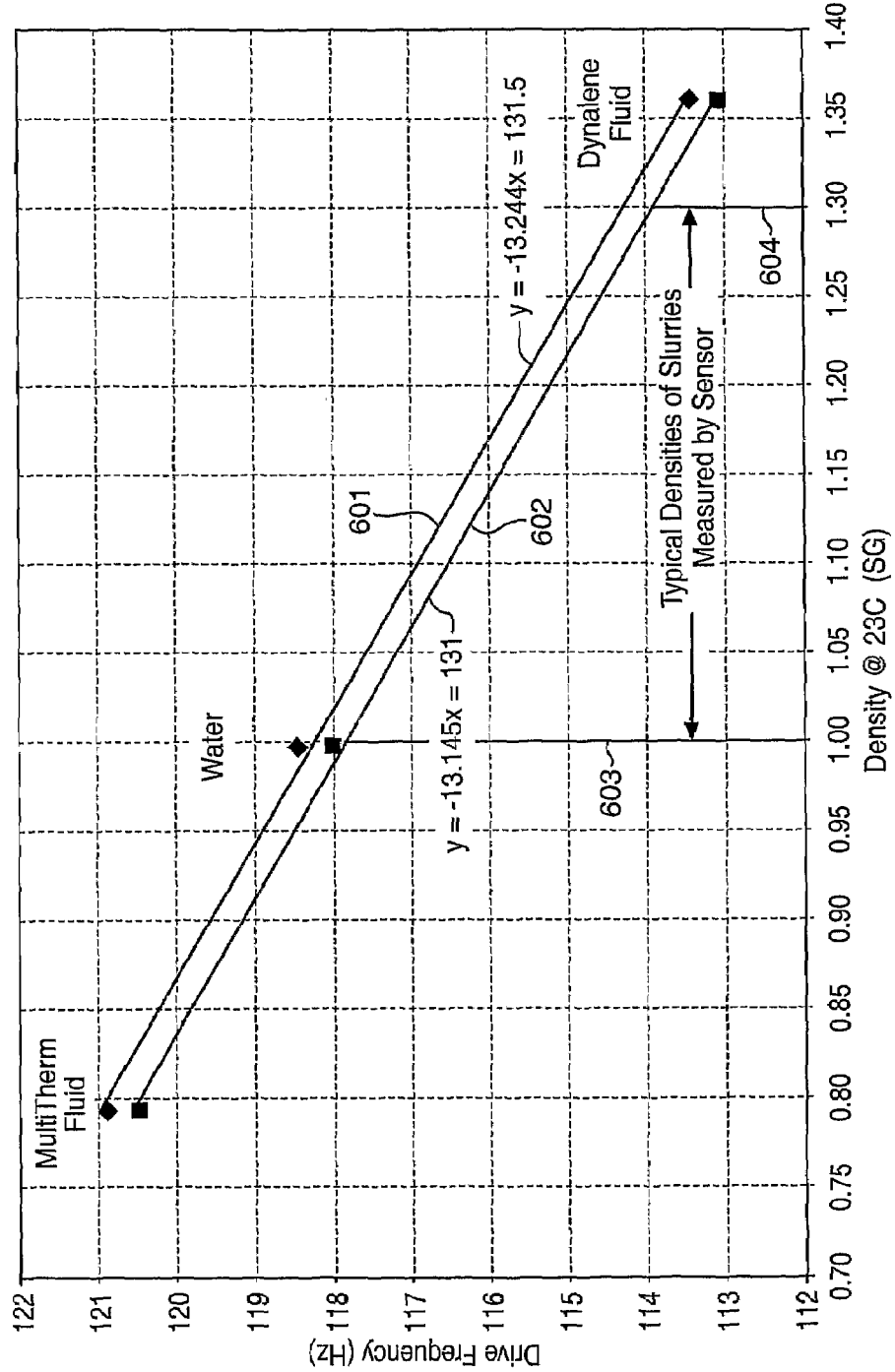
FIG. 6 is a graph showing the relationship between drive frequency and material density.

Description of FIG. 6

FIG. 6 graphs drive frequency versus fluid specific gravity for the same two sensors on trend lines 601 and 602. The sensors are specified to measure flow rate of slurries whose fluid densities are from 1.0 to 1.3 SG as shown for trend lines 603 and 604. Three fluids were used to span the density operating range of the sensor. Three data points were taken for each sensor and a trend line was fit to the data. Using the slope of each trend line, we can estimate the sensitivity of drive frequency as 4 Hz per FS density swing. This seems significant, but is should be noted that each Coriolis flow meter is installed on a particular process using a particular fluid in this range. Further, once installed, users typically calibrate their process to the actual flow output, eliminating errors due to new process fluid in the device.

Description of FIGS. 7-12

FIGS. 7-12 describe the method by which the calibration constants $\Delta t_0$, $\alpha_F$, $\alpha_{\dot{m}}$, $\alpha_{\dot{m}F}$ of flow equation 1.5 are derived using the calibration procedure of the present invention. These calibration constants are derived using equation 1.10. Once derived, these are used in flow equation 1.5 together with the measured values of drive frequency F and Δt (Flow induced time delay) to determine the measured flow rate $\dot{m}$. This is described in detail in the following paragraphs. The calibration constants $\Delta t_0$, $\alpha_F$, $\alpha_{\dot{m}}$, $\alpha_{\dot{m}F}$ are derived using a four level procedure as next described.

A master Coriolis flow meter and the Coriolis flow meter to be calibrated are connected in series and a test flow is applied. The flow data corresponding to Runs 1-4 of Table 1 below is used for the calibration. The Test Matrix for identifying mass flow of the master test meter and temperature/frequency contributions to Δt is shown in Table 1. The measured mass flow from the master Coriolis flow meter and the series connected tested Coriolis flow meter are shown in FIG. 7.

TABLE 1

| Run | Mass Flow (g/min) | Fluid Temperature C. |
|-----|-------------------|----------------------|
| 1 | 350 | 28 |
| 2 | 50 | 28 |
| 3 | 350 | 18 |
| 4 | 50 | 18 |

Figure 7:
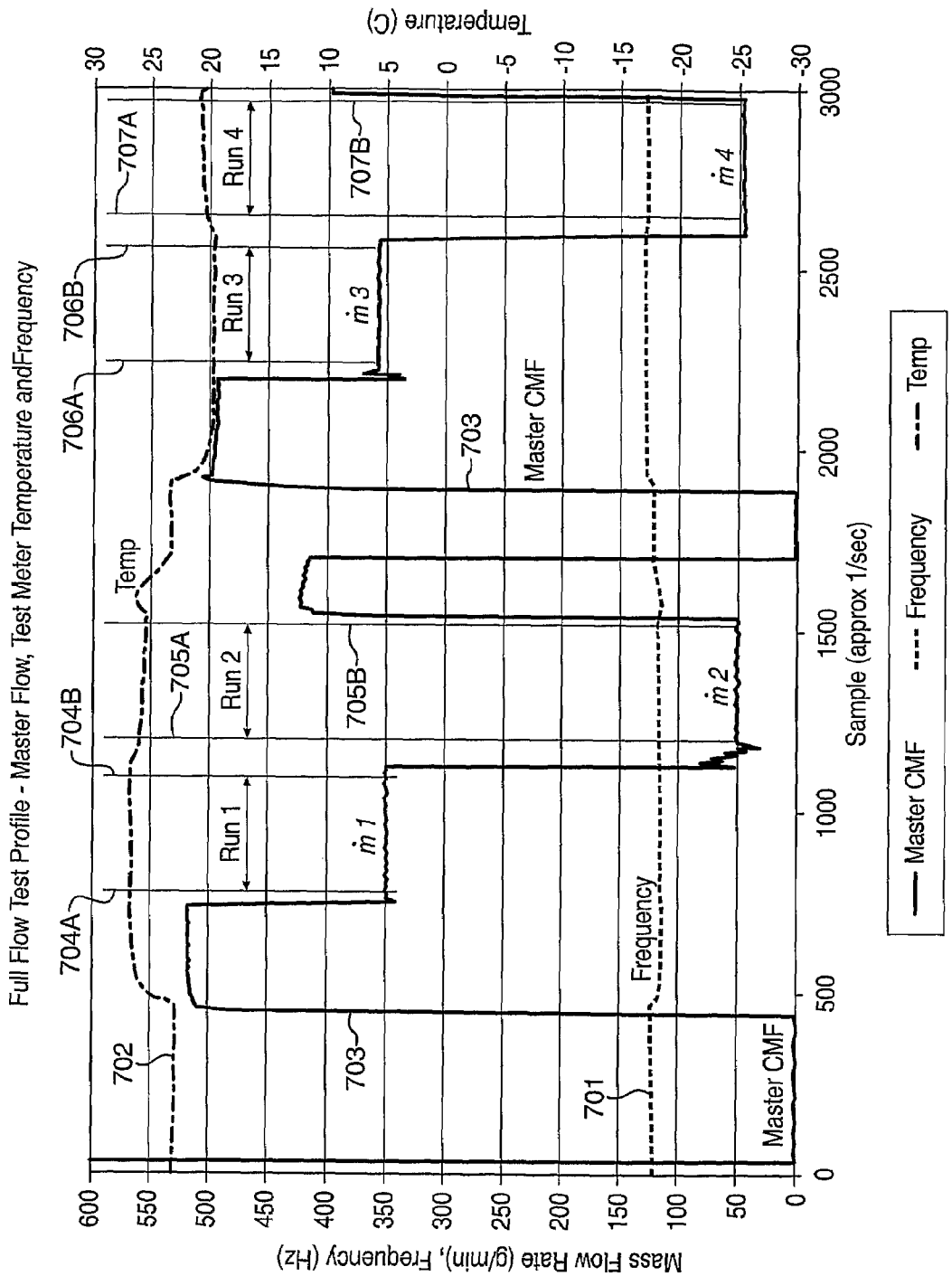
FIGS. 7-9 are graphs showing the collection of data during calibration.

The measured mass flow from the master Coriolis flow meter and the series connected test Coriolis flow meter using the four test runs of Table 1 are shown in FIG. 7. The four runs are shown of FIG. 7 together with the corresponding values of temperature, drive frequency and $\dot{m}$ for the master Coriolis flow meter are used. Line 703 represents the flow rate of the master Coriolis flow meter.

Figure 8:
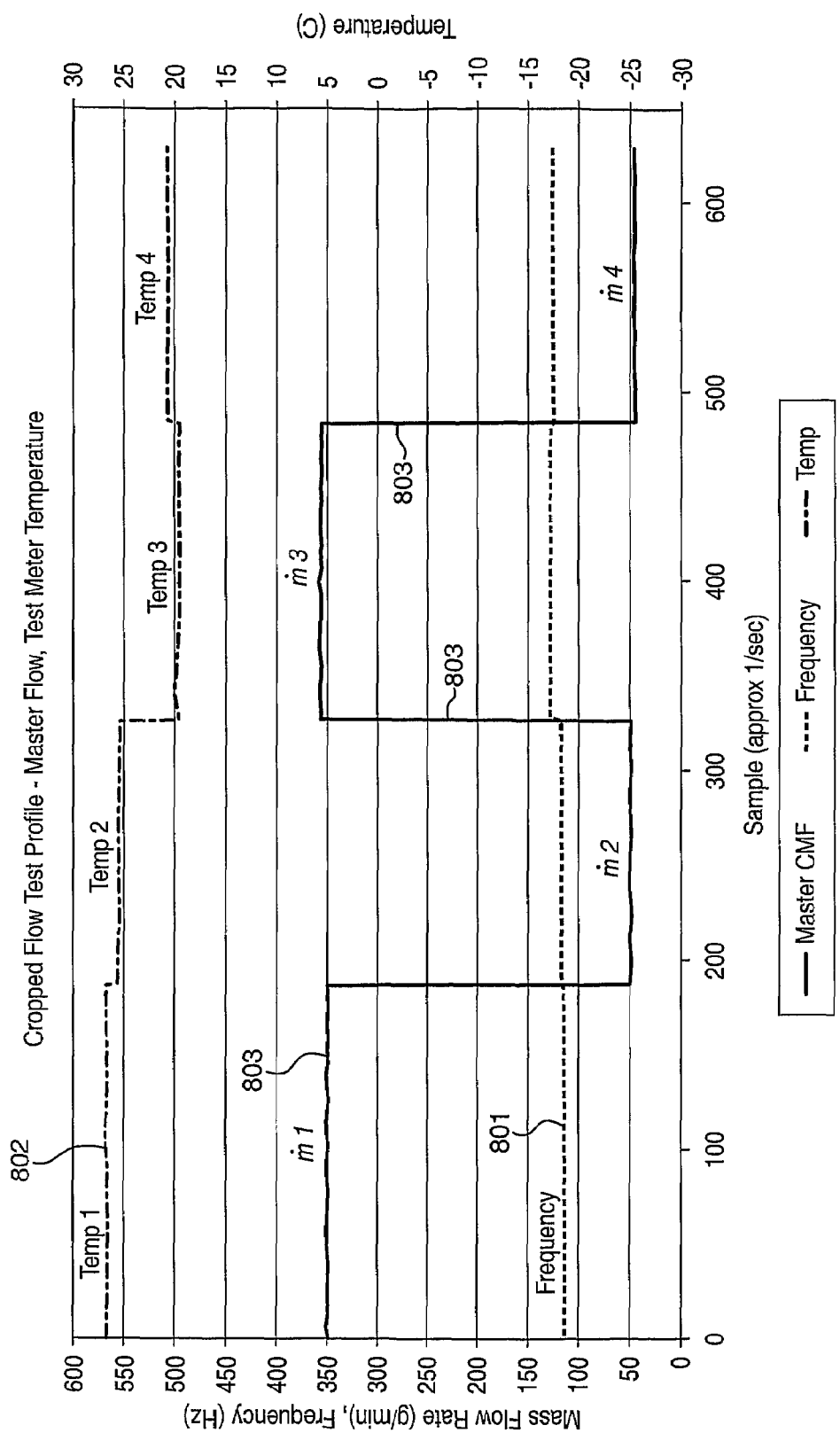

FIG. 8 illustrates the data obtained for the four tests runs of FIG. 7. This is the data profile that is used, as subsequently described for equation 1.10, to derive the values of the calibration constants $\Delta t_0$, $\alpha_F$, $\alpha_{\dot{m}}$, $\alpha_{\dot{m}F}$. Line 803 represents the flow rate of the master Coriolis flow meter.

Figure 9:
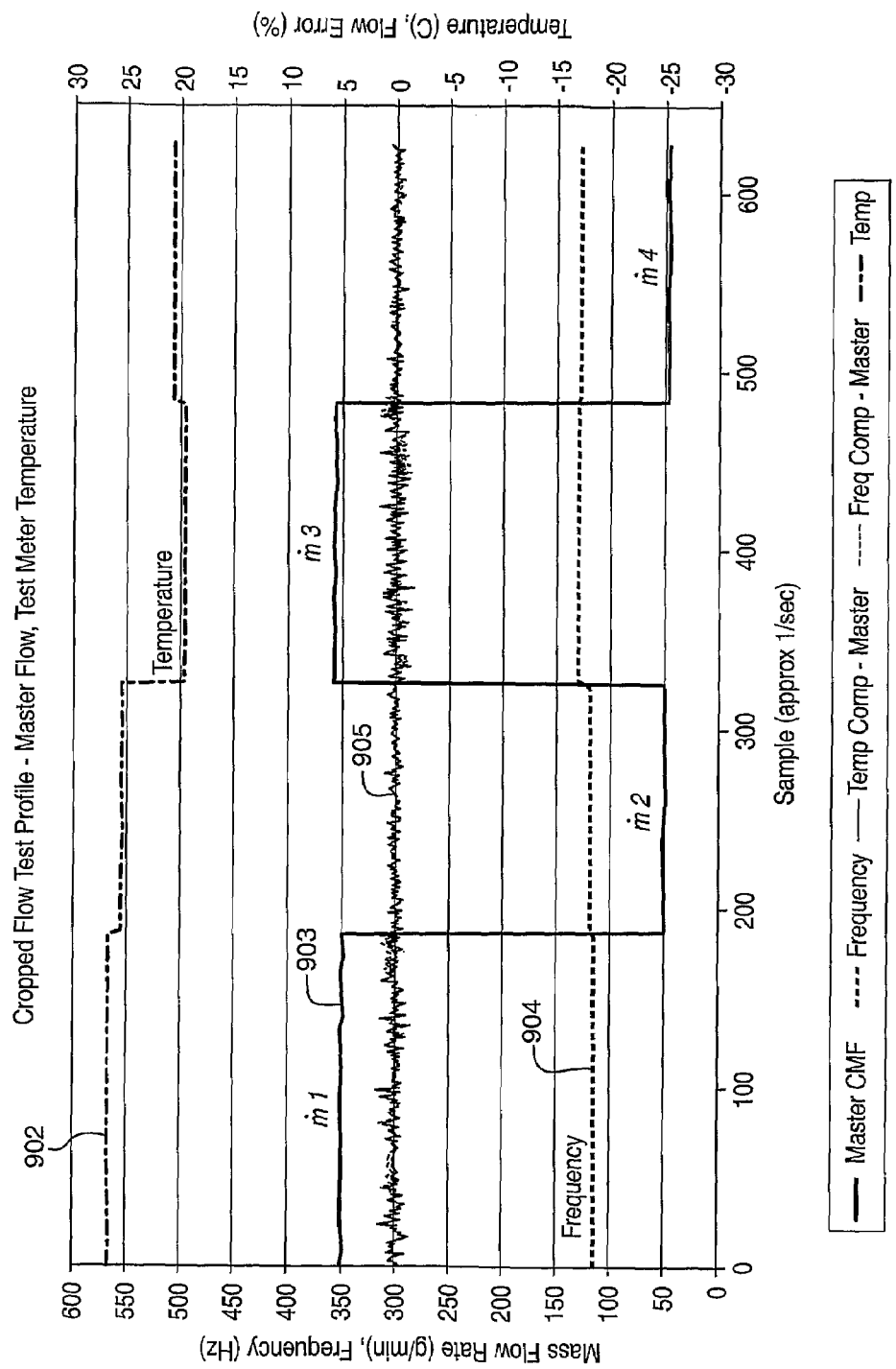

FIG. 9 shows the results of using both frequency and temperature (RTD) compensation for steady flow states. Both methods give a good data fit for calibration of the Coriolis flow meter during steady state flow conditions. FIG. 9 shows drive frequency on line 901, temperature on line 902, flow rate $\dot{m}$ for each run on line 903 and the error rate on line 905. The results of both methods of compensation are represented by line 905 since they are both congruent for steady state flows. This accuracy is indicated by zero error for both methods across line 905 all four test runs.

Figure 15:
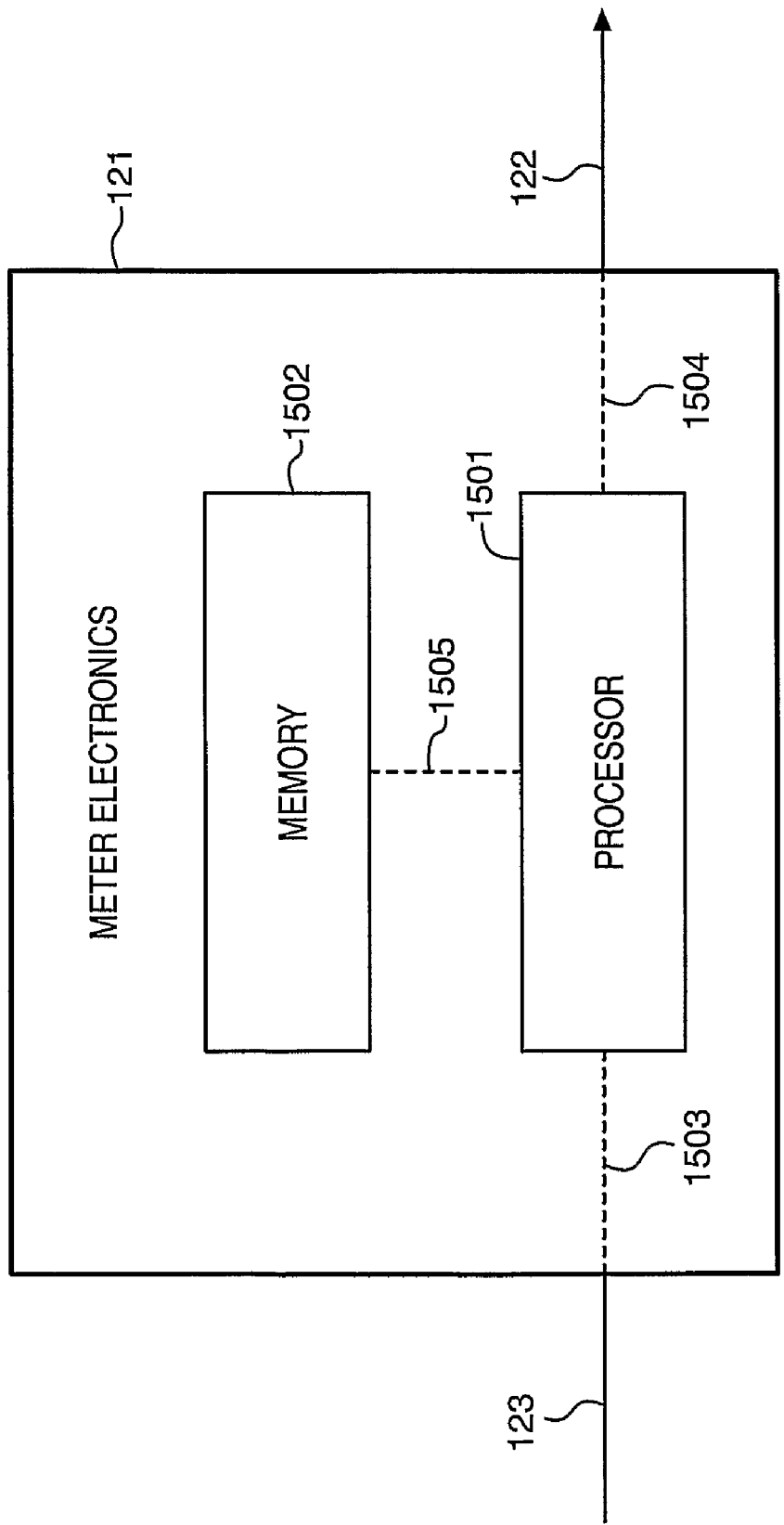
FIG. 15 illustrates further details of Meter Electrons 121 of FIG. 1.

Meter electronics 121, shown on FIGS. 1 and 15, executes the data processing functions required to implement the operations shown on FIGS. 7-9.

Description of FIGS. 10 and 11

FIG. 10 is a block diagram 1000 describing how the method and apparatus of the present invention derives the calibration constants. FIG. 10 discloses a plurality of processing or program steps each representing one or more program instructions stored in memory 1502 of Coriolis flow meter electronics 121. The instructions are executed by processor 1502 of the Coriolis flow meter electronics 121 with the results either being stored in memory 1501 of the flow meter electronics or being outputted to a user over path 122. The process of FIG. 10 derives the calibration constants $\Delta t_0$, $\alpha_F$, $\alpha_{\dot{m}}$, $\alpha_{\dot{m}F}$. The derived calibration constants are inputted to FIG. 13 where they are used to derive a temperature compensated mass flow rate $\dot{m}$.

On FIG. 10, element 1002 receives the input pick-off signals and from LPO and RPO of FIG. 1 and applies them to element 1004 which uses the received information to derive the detected Δt and the drive frequency F of the flow meter under test. Element 1006 receives from element 1003 the signals representing the measured flow rate $\dot{m}$ of the series connected reference flow meter. Element 1006 receives the above indicated information from elements 1004 and 1003 and uses them to derive the calibration constants $\Delta t_0$, $\alpha_F$, $\alpha_{\dot{m}}$, $\alpha_{\dot{m}F}$ by solving equation 1.10.

The derived calibration constants are extended from element 1006 to element 1106 of FIG. 11. Element 1102 receives the input pick-off signals from pick-offs LPO and RPO of FIG. 1 for the flow meter under tests. This information is extended to element 1104 which derives the Δt and the drive frequency F for the flow meter under test and extends them to element 1106. Element 1106 receives the outputs of elements 1104 and 1006 to derive the temperature compensated mass flow rate of the flow meter under test by using the equation 1.5 indicated in element 1106. The terms Δt and $\Delta t_0$ are derived by element 1006. The expression $F-F_0$ in both the numerator and dominator of equation 1.5 are obtained by element 1106 from element 1104. The term $\alpha_F$ is obtained by the element 1004. The terms $\alpha_m$ and $\alpha_{mF}$ are obtained from element 1104.

Element 1106 employs all of the terms on the right side of equation 1.5 to provide a temperature compensated mass flow rate output to a user over output 122 of FIG. 1 from meter electronics 121.

Description of FIG. 12

FIG. 12 shows the method the present invention employs to derive the calibration constants $\Delta t_0$, $\alpha_F$, $\alpha_m$, $\alpha_{mF}$ using equation 1.10. The derivation of the calibration constants $\Delta t_0$, $\alpha_F$, $\alpha_m$, $\alpha_{mF}$ of the Flow Meter Under Test (FMUT) requires:

The actual flow measurement from a series connected reference flow meter connected in series with the Coriolis flow meter under test.

Temperature measurement from the FMUT.

Drive Frequency measurement from the FMUT.

These measurements are made while the FMUT is subjected to process conditions shown in table 1 as shown below.

TABLE 1

| Run | Ideal Reference Mass Flow (g/min) | Ideal Fluid Temperature C. |
|---|---|---|
| 1 | 350 | 28 |
| 2 | 50 | 28 |
| 3 | 350 | 18 |
| 4 | 50 | 18 |

The Actual Reference Mass Flow and Fluid Temperature may differ from the Ideal Reference Mass Flow and the Fluid Temperature due to limitations in the controllability of the flow stand on which the FMUT is being calibrated.

For each run of table 1, multiple measurements of Actual Mass Flow, the FMUT temperature and the FMUT drive frequency are made. Let:

M=# of measurements of the three aforementioned quantities during Run 1.

N=# of measurements of the three aforementioned quantities during Run 2.

O=# of measurements of the three aforementioned quantities during Run 3.

P=# of measurements of the three aforementioned quantities during Run 4.

During the calibration Runs of FIG. 8, the reference mass flow ṁ, the FMUT temperature and the FMUT drive frequency are each be measured M+N+O+P times. It is required that M+N+O+P be at least equal to the number of parameters being solved using Equation 1.10. However, it is recommended that the sum M+N+O+P be much greater than the number of parameters being solved for. This is the definition of a least-squares problem, which is what we are trying to solve.

To eliminate confusion, let's assume M=N=O=P, so that the total number of measurements of reference Mass Flow, the FMUT temperature and the FMUT frequency is 4 times M. Dimensionally, the calibration problem shown in Equation 1.10, dictated by table 1 and depicted in FIG. 8 is also shown in FIG. 12.

Once the data of FIG. 8 is taken and the equation 1.10 is solved, four values are obtained, namely $\Delta t_0$, $\alpha_F$, $\alpha_m$, $\alpha_{mF}$. These are the desired calibration constants. The term $\Delta t_0$ is the Zero offset of the FMUT. This value comes from zeroing the meter in the traditional sense (i.e. pushing the zero button). The term $\alpha_F$ is the linear Frequency (hence temperature) effect on zero offset of the FMUT. The term $\alpha_m$ is the Flow Cal Factor (FCF) of the FMUT.

The term $\alpha_{mF}$ is the linear frequency (hence temperature) effect on FCF of FMUT. These calibration constants can now be used in Equation 1.5, to calculate FMUT mass flow compensated for frequency (hence temperature) effects.

Meter electronics 121, shown on FIGS. 1 and 15, executes the data processing required to implement the operations shown on FIG. 12.

Figure 13:
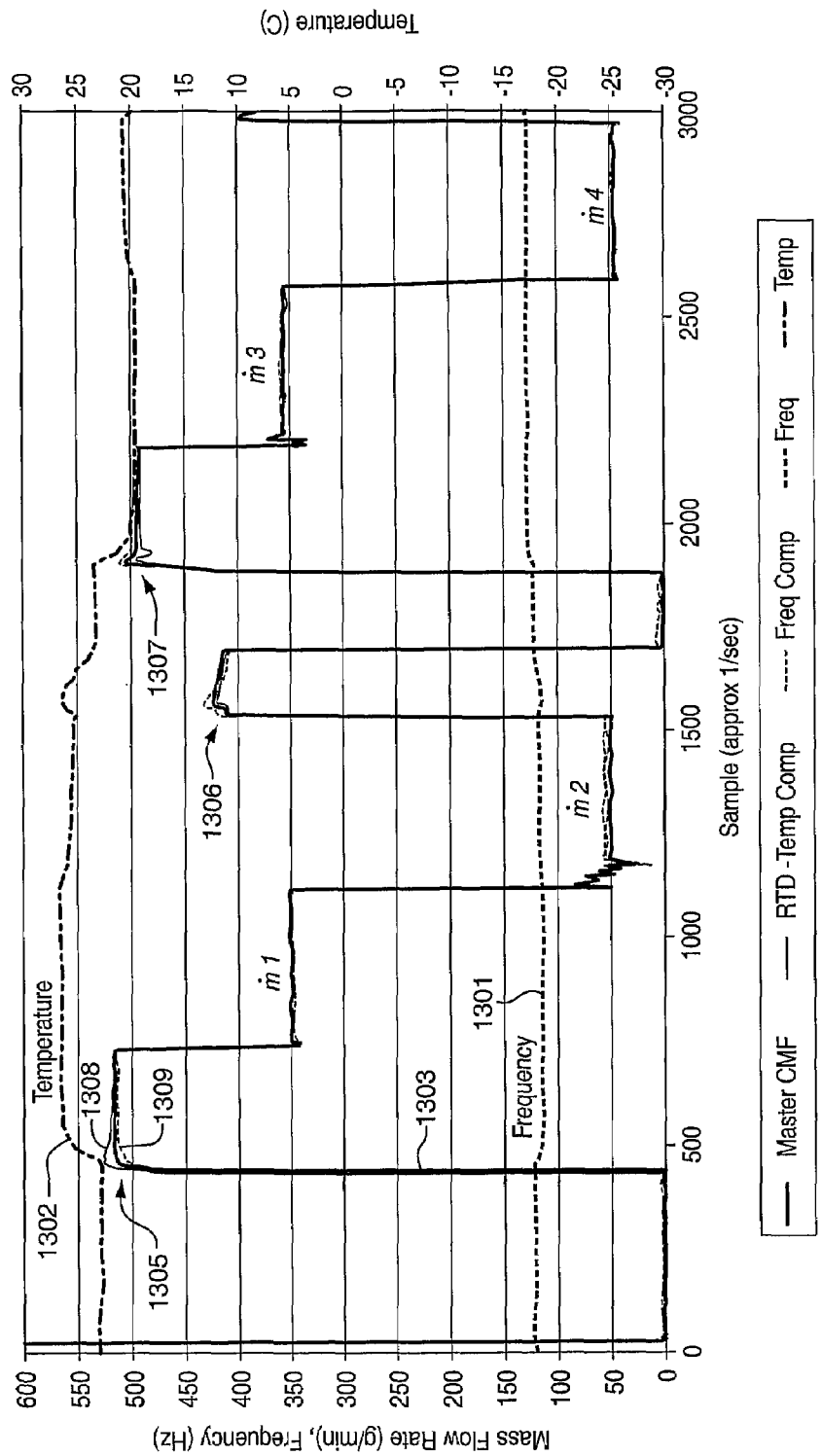
FIGS. 13 and 14 illustrate the comparative accuracies of the use of frequency changes versus RTD to provide thermal compensation.

Description of FIG. 13

FIG. 13 shows the results of using frequency determination to achieve thermal compensation as compared to the use of RTD thermal sensors to monitor flow tube frequency and provide thermal compensation. FIG. 13 clearly shows the merit of frequency based temperature compensation as compared to the use of the RTD. Line 1303 represent the mass flow provided by the master Coriolis flow meter. Solid line 1308 portrays the results obtained using RTD sensors. Dotted line 1309 illustrates the use of frequency monitoring as provided in accordance with the present invention.

Line 1303 portrays the drive frequency. Line 1302 portrays the temperature. Line 1301 portrays the resultant mass flow rate. In the straight portions of line 1303, the results of the master, the RTD and the use of frequency overlay one another the results diverging only in the portions represented by portions 1305, 1306, and 1307 which represent sudden changes in mass flow rate. Element 1305 contains lines 1303, 1308, and 1309. Line 1303 represents the mass flow rate of the master. Line 1308 represents the response of the RTD. Line 1309 represents the response using frequency monitoring. It can be seen that the line 1303 and 1309 responses are essentially the same in the period of transition represented by element 1305. In can also be seen that the response 1308 of element 1305 indicates that the response of the RTD diverges considerably from that compared to that of the master. The same observation may be made with respect to elements 1306 and 1307 where the results obtained using frequency compensation in portrayed by line 1309 follow more closely the response of the master as portrayed by line 1303 then does the results portrayed by the line 1308 representing the results obtained using RTD thermal compensation.

The mass flow rate $\dot{m}_1, \dot{m}_2, \dot{m}_3$, and $\dot{m}_4$ on FIG. 13 correspond to the correspondingly designated elements on FIGS. 7, 8, and 9.

The conclusion to be reached from an analysis of FIG. 13 is that the use of frequency monitoring to provide thermal compensation is far superior to that of the use of RTD when accuracies is desired during transient conditions of the mass flow rate.

Meter electronics 121, shown on FIGS. 1 and 15, executes the data processing required to implement the operations shown on FIG. 13.

Figure 14:
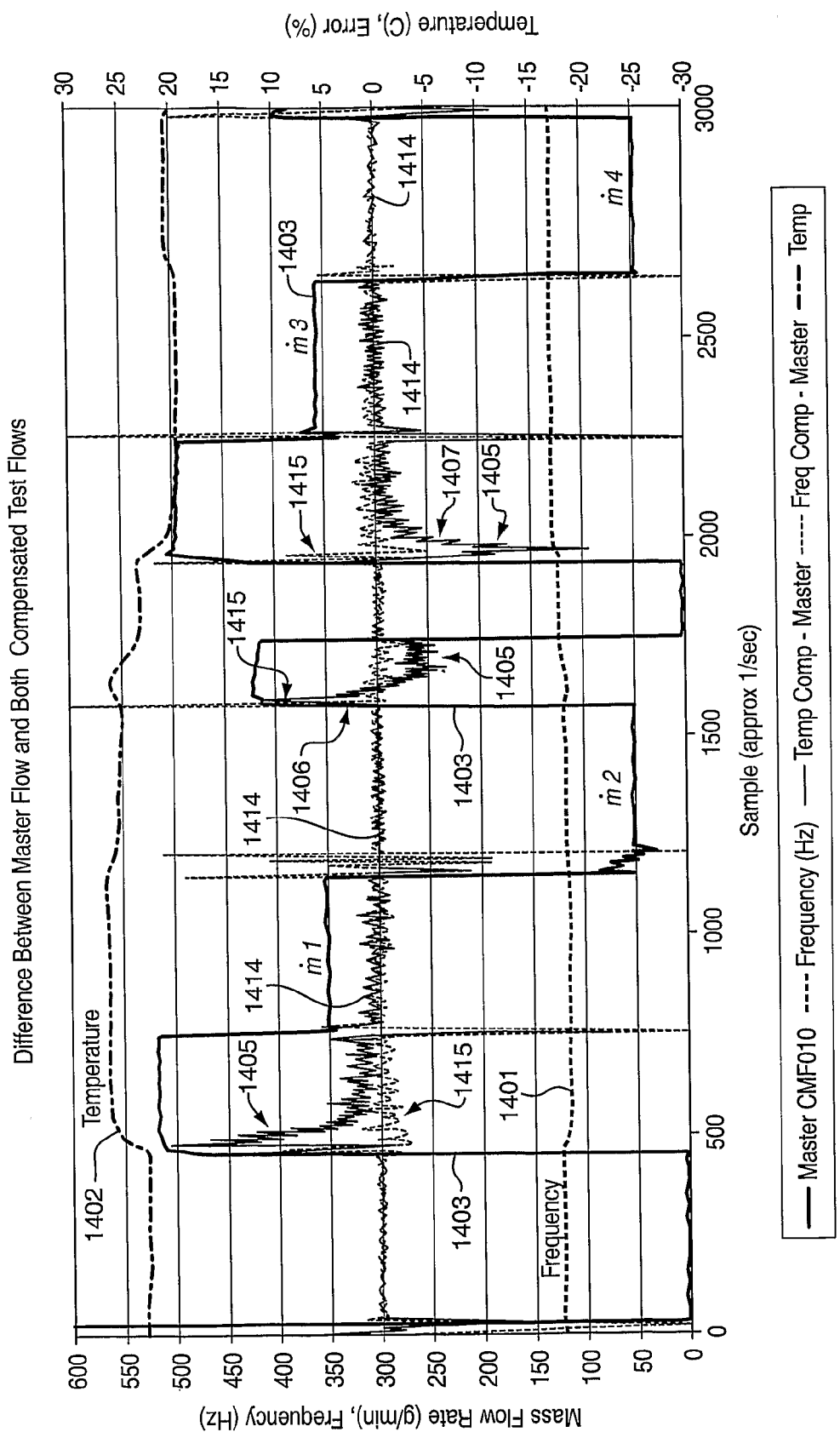

Description of FIG. 14

FIG. 14 discloses the comparative accuracies of the response using frequency monitoring as compared to the use of RTD. Line 1401 portrays the drive frequency, line 1402 portrays the temperature, and line 1403 portrays the mass flow rate. Line 1414 portrays the compensation error produced by the use of frequency monitoring as compared to the use of RTD. It can be seen, use of RTD versus frequency monitoring produces comparable results when the mass flow rate is essentially constant. However, the elements 1405, 1406, and 1407 indicate conditions where the mass flow rate is undergoing transients. As shown for the element 1405, the response of using frequency monitoring 1415 corresponds to the mass flow rate 1414 of the master more closely than does the response 1405 of the RTD.

Meter electronics 121, shown on FIGS. 1 and 15, executes the data processing required to implement the operations shown on FIG. 14.

Description of FIG. 15

As shown on FIG. 15, meter electronics 121 includes a processor 1501 and a memory 1502.

Processor 1501 may comprise a conventional CPU. Alternatively it may comprise a special or a general-purpose processor or a DSP. Memory 1502 may comprise any type of memory system, such as flash memory or a conventional ROM and RAM, for the storing information on both a long-term and short-term basis.

Meter electronics 121 receives input information over path 123 and applies its output information over path 122 to a user. Meter electronics 121 receives input signals over path 123 from pickoffs LPO and RPO. These pickoff signals are shown on FIG. 10 in element 1002. The pickoffs signals are applied from element 1002 to element 1004 which performs the indicated functions and outputs its information to element 1006. Elements 1002 and 1004 are duplicated on FIG. 11 as elements 1102 and 1104. Element 1006 on FIG. 10 receives the outputs of elements 1004 and 1003 and derives the indicated calibration constants. Memory 1502 and processor 1501 of FIG. 15 are used for this function.

Element 1106 on FIG. 11 receives the outputs of element 11006 and element 1104 and derives the indicated the mass flow rate by solving equation 1.5. These functions are performed by the memory 1502 and the processor 1501 of FIG.15.

Memory 1502 and processor 1501 of meter electronics 121 are also used to perform the various computations and functions shown in on FIGS. 5, 6, 7, 8, 9, 12, 13 and 14.

It is to be expressly understood that the claimed invention is not to be limited to the description of the preferred embodiment but encompasses other modifications and alterations within the scope and spirit of the inventive concept. While specific relationships and equations have been described in connection with the invention, it is to be understood that the invention includes and may be practiced using modifications of the disclosed equations and relationships. Also although the method and apparatus is shown in conjunction with a Coriolis flow meter, it should be under stood that the method and apparatus of the invention can be used with a Coriolis flow meter of any type including a Coriolis flow meter having metal, plastics or glass flow tube(s).

The invention claimed is:

1. A method for providing thermal compensation for a Coriolis flow meter having at least one flow tube; said method comprising the steps of:
    generating a first signal representing Coriolis deflections of said flow tube;
    generating a second signal representing characteristics of said flow meter, wherein said characteristics include the drive frequency F of said Coriolis flow meter as well as an induced time delay $\Delta t$; and
    characterized by the provision of meter electronics for using said first and said second signals to provide thermal compensation for output signals of said Coriolis flow meter.

2. The method of claim 1 wherein said step of providing thermal compensation including the steps of:
    receiving a calibrated mass flow rate from a master Coriolis flow meter, and
    using said first and said second signals and said calibrated mass flow rate to provide said thermal compensation for said Coriolis flow meter.

3. The method of claim 2 wherein said step of providing thermal compensation includes the steps of:
    using said first and said second signals and said calibrated mass flow rate to derive calibration constants for said Coriolis flow meter; and
    using said calibration constants to provide said thermal compensation for said Coriolis flow meter.

4. The method of claim 3 wherein said step of deriving said calibration constants comprises the step of:
    receiving a mass flow rate $\dot{m}$ from a master Coriolis flow meter; and
    using said received mass flow rate $\dot{m}$ and said second signal for deriving said calibration constants of said Coriolis flow meter.

5. The method of claim 4 wherein said step of generating said calibration constants comprises the further steps of:
    receiving said second signal to derive a flow induced time delay $\Delta t$ and said drive frequency F of the Coriolis flow meter; and
    using said first signal and said flow induced time delay $\Delta t$ and said drive frequency F for deriving said calibration constants of said Coriolis flow meter.

6. The method of claim 5 wherein said step of generating said calibration constants comprises the further steps of:
    deriving a linear drive frequency constant $\alpha_F$ for a nominal time delay $\Delta t_0$; and;
    using said drive frequency F, and said linear drive frequency constant $\alpha_F$ for said nominal time delay $\Delta t_0$ to derive said calibration constants.

7. The method of claim 6 wherein said calibration constants are:

$$\Delta t_0, \alpha_F, \alpha_m, \alpha_{mF}.$$

8. The method of claim 5 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([\,1\ \ (F - F_0)\ \ \dot{m}\ \ \dot{m}(F - F_0)\,])\Delta t \qquad 1.10$$

Where
  $\Delta t$ Flow induced time delay
  $\Delta t_0$ Nominal time delay
  $\dot{m}$ Mass Flow Rate
  F Drive Frequency
  Fo Drive Frequency—nominal zero flow
  $\alpha_F$ Linear Frequency constant for zero
  $\alpha_m$ Coefficient related to FCF
  $\alpha_{mF}$ Linear frequency (temp) constant.

9. The method of claim 6 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([\,1\ \ (F-F_0)\ \ \dot{m}\ \ \dot{m}(F-F_0)\,])\Delta t \qquad 1.10$$

Where
  $\Delta t$ Flow induced time delay
  $\Delta t_0$ Nominal time delay
  $\dot{m}$ Mass Flow Rate
  F Drive Frequency
  Fo Drive Frequency—nominal zero flow
  $\alpha_F$ Linear Frequency constant for zero
  $\alpha_m$ Coefficient related to FCF
  $\alpha_{mF}$ Linear frequency (temp) constant.

10. The method of claim 4 wherein said calibration constants are:

$\Delta t_0, \alpha_F, \alpha_m, \alpha_{mF}$.

11. The method of claim 3 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([\,1\ \ (F-F_0)\ \ \dot{m}\ \ \dot{m}(F-F_0)\,])\Delta t \qquad 1.10$$

Where
  $\Delta t$ Flow induced time delay
  $\Delta t_0$ Nominal time delay
  $\dot{m}$ Mass Flow Rate
  F Drive Frequency
  Fo Drive Frequency—nominal zero flow
  $\alpha_F$ Linear Frequency constant for zero
  $\alpha_m$ Coefficient related to FCF
  $\alpha_{mF}$ Linear frequency (temp) constant.

12. The method of claim 2 including the further step of determining a thermally compensated flow rate for said Coriolis flow meter in response to said generation of said first and second signals and said provision of said thermal compensation for said Coriolis flow meter.

13. The method of claim 12 including the further steps of:
determining a drive frequency F from said second signal;
deriving a linear frequency calibration constant $\alpha_F$ for zero; and
using said drive frequency F and said linear frequency calibration constant $\alpha_F$ for zero to derive said thermally compensated flow rate.

14. The method of claim 12 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([\,1\ \ (F-F_0)\ \ \dot{m}\ \ \dot{m}(F-F_0)\,])\Delta t \qquad 1.10$$

Where
  $\Delta t$ Flow induced time delay
  $\Delta t_0$ Nominal time delay
  $\dot{m}$ Mass Flow Rate
  F Drive Frequency
  Fo Drive Frequency—nominal zero flow
  $\alpha_F$ Linear Frequency constant for zero
  $\alpha_m$ Coefficient related to FCF
  $\alpha_{mF}$ Linear frequency (temp) constant.

15. The method of claim 13 compensated mass flow rate including further steps of:
deriving a coefficient $\alpha_m$ for flow; and
using said drive frequency F and said linear drive frequency constant $\alpha_F$ for zero, and said constant $\alpha_m$ for flow to derive said thermally compensated flow rate.

16. The method of claim 15 including the further steps of:
deriving a linear frequency (temp) constant $\alpha_{mF}$ for flow; and
using said drive frequency F and said linear drive frequency constant $\alpha_F$ for zero and said constant $\alpha_m$ for flow and said linear frequency (temp) constant $\alpha_{mF}$ for flow to derive said thermally compensated mass flow rate.

17. The method of claim 16 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([\,1\ \ (F-F_0)\ \ \dot{m}\ \ \dot{m}(F-F_0)\,])\Delta t \qquad 1.10$$

Where
  $\Delta t$ Flow induced time delay
  $\Delta t_0$ Nominal time delay
  $\dot{m}$ Mass Flow Rate
  F Drive Frequency
  Fo Drive Frequency—nominal zero flow
  $\alpha_F$ Linear Frequency constant for zero
  $\alpha_m$ Coefficient related to FCF
  $\alpha_{mF}$ Linear frequency (temp) constant.

18. The method of claim 16 wherein said step of determining said thermally compensated mass flow rate comprises the step of solving the expression:

$$\dot{m} = \frac{\Delta t - \Delta t_0 - (F-F_0)\alpha_F}{[\alpha_{\dot{m}} + (F-F_0)\alpha_{\dot{m}F}]} \qquad 1.5$$

Where:
  $\Delta t$ Flow induced time delay
  $\Delta t_0$ Nominal time delay
  $\dot{m}$ Mass Flow Rate
  F Drive Frequency
  $F_0$ zero drive frequency
  $\alpha_F$ Linear Frequency constant for zero
  $\alpha_m$ constant related to FCF
  $\alpha_{mF}$ Linear FCF frequency (temp) constant.

19. The method of claim 3 including the further step of determining a thermally compensated flow rate for said Coriolis flow meter in response to said generation of said first and second signals and said provision of said thermal compensation for said Coriolis flow meter.

20. The method of claim 19 including the further steps of:
determining a drive frequency F from said second signal;
deriving a linear frequency calibration constant $\alpha_F$ for zero; and
using said drive frequency F and said linear frequency calibration constant $\alpha_F$ for zero to derive said thermally compensated flow rate.

21. The method of claim 20 compensated mass flow rate including further steps of:
deriving a coefficient $\alpha_m$ for flow; and
using said drive frequency F and said linear drive frequency constant $\alpha_F$ for zero, and said constant $\alpha_m$ for flow to derive said thermally compensated flow rate.

22. The method of claim 21 including the further steps of:
deriving a linear frequency (temp) constant $\alpha_{mF}$ for flow; and
using said drive frequency F and said linear drive frequency constant $\alpha_F$ for zero and said constant $\alpha_m$ for flow and said linear frequency (temp) constant $\alpha_{mF}$ for flow to derive said thermally compensated mass flow rate.

23. The method of claim 22 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([1 \quad (F-F_0) \quad \dot{m} \quad \dot{m}(F-F_0)])\Delta t \qquad 1.10$$

Where
$\Delta t$ Flow induced time delay
$\Delta t_0$ Nominal time delay
$\dot{m}$ Mass Flow Rate
F Drive Frequency
Fo Drive Frequency—nominal zero flow
$\alpha_F$ Linear Frequency constant for zero
$\alpha_m$ Coefficient related to FCF
$\alpha_{mF}$ Linear frequency (temp) constant.

24. The method of claim 22 wherein said step of determining said thermally compensated mass flow rate comprises the step of solving the expression:

$$\dot{m} = \frac{\Delta t - \Delta t_0 - (F-F_0)\alpha_F}{[\alpha_{\dot{m}} + (F-F_0)\alpha_{\dot{m}F}]} \qquad 1.5$$

Where:
$\Delta t$ Flow induced time delay
$\Delta t_0$ Nominal time delay
$\dot{m}$ Mass Flow Rate
F Drive Frequency
$F_0$ zero drive frequency
$\alpha_F$ Linear Frequency constant for zero
$\alpha_m$ constant related to FCF
$\alpha_{mF}$ Linear FCF frequency (temp) constant.

25. The method of claim 5 wherein said calibration constants are:

$\Delta t_0, \alpha_F, \alpha_m, \alpha_{mF}$.

26. The method of claim 4 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([1 \quad (F-F_0) \quad \dot{m} \quad \dot{m}(F-F_0)])\Delta t \qquad 1.10$$

Where
$\Delta t$ Flow induced time delay
$\Delta t_0$ Nominal time delay
$\dot{m}$ Mass Flow Rate
F Drive Frequency
Fo Drive Frequency—nominal zero flow
$\alpha_F$ Linear Frequency constant for zero
$\alpha_m$ Coefficient related to FCF
$\alpha_{mF}$ Linear frequency (temp) constant.

27. The method of claim 19 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([1 \quad (F-F_0) \quad \dot{m} \quad \dot{m}(F-F_0)])\Delta t \qquad 1.10$$

Where
$\Delta t$ Flow induced time delay
$\Delta t_0$ Nominal time delay
$\dot{m}$ Mass Flow Rate
F Drive Frequency
Fo Drive Frequency—nominal zero flow
$\alpha_F$ Linear Frequency constant for zero
$\alpha_m$ Coefficient related to FCF
$\alpha_{mF}$ Linear frequency (temp) constant.

28. The method of claim 20 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([1 \quad (F-F_0) \quad \dot{m} \quad \dot{m}(F-F_0)])\Delta t \qquad 1.10$$

Where
$\Delta t$ Flow induced time delay
$\Delta t_0$ Nominal time delay
$\dot{m}$ Mass Flow Rate
F Drive Frequency
Fo Drive Frequency—nominal zero flow
$\alpha_F$ Linear Frequency constant for zero
$\alpha_m$ Coefficient related to FCF
$\alpha_{mF}$ Linear frequency (temp) constant.

29. The method of claim 21 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([\,1 \quad (F-F_0) \quad \dot{m} \quad \dot{m}(F-F_0)\,])\Delta t \qquad 1.10$$

Where
  $\Delta t$ Flow induced time delay
  $\Delta t_0$ Nominal time delay
  $\dot{m}$ Mass Flow Rate
  F Drive Frequency
  Fo Drive Frequency—nominal zero flow
  $\alpha_F$ Linear Frequency constant for zero
  $\alpha_m$ Coefficient related to FCF
  $\alpha_{mF}$ Linear frequency (temp) constant.

30. The method of claim 19 wherein said step of determining said thermally compensated mass flow rate comprises the step of solving the expression:

$$\dot{m} = \frac{\Delta t - \Delta t_0 - (F - F_0)\alpha_F}{[\alpha_{\dot{m}} + (F - F_0)\alpha_{\dot{m}F}]} \qquad 1.5$$

Where:
  $\Delta t$ Flow induced time delay
  $\Delta t_0$ Nominal time delay
  $\dot{m}$ Mass Flow Rate
  F Drive Frequency
  $F_0$ zero drive frequency
  $\alpha_F$ Linear Frequency constant for zero
  $\alpha_m$ constant related to FCF
  $\alpha_{mF}$ Linear FCF frequency (temp) constant.

31. The method of claim 20 wherein said step of determining said thermally compensated mass flow rate comprises the step of solving the expression:

$$\dot{m} = \frac{\Delta t - \Delta t_0 - (F - F_0)\alpha_F}{[\alpha_{\dot{m}} + (F - F_0)\alpha_{\dot{m}F}]} \qquad 1.5$$

Where:
  $\Delta t$ Flow induced time delay
  $\Delta t_0$ Nominal time delay
  $\dot{m}$ Mass Flow Rate
  F Drive Frequency
  $F_0$ zero drive frequency
  $\alpha_F$ Linear Frequency constant for zero
  $\alpha_m$ constant related to FCF
  $\alpha_{mF}$ Linear FCF frequency (temp) constant.

32. The method of claim 21 wherein said step of determining said thermally compensated mass flow rate comprises the step of solving the expression:

$$\dot{m} = \frac{\Delta t - \Delta t_0 - (F - F_0)\alpha_F}{[\alpha_{\dot{m}} + (F - F_0)\alpha_{\dot{m}F}]} \qquad 1.5$$

Where:
  $\Delta t$ Flow induced time delay
  $\Delta t_0$ Nominal time delay
  $\dot{m}$ Mass Flow Rate
  F Drive Frequency
  $F_0$ zero drive frequency
  $\alpha_F$ Linear Frequency constant for zero
  $\alpha_m$ constant related to FCF
  $\alpha_{mF}$ Linear FCF frequency (temp) constant.

33. The method of claim 13 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([\,1 \quad (F-F_0) \quad \dot{m} \quad \dot{m}(F-F_0)\,])\Delta t \qquad 1.10$$

Where
  $\Delta t$ Flow induced time delay
  $\Delta t_0$ Nominal time delay
  $\dot{m}$ Mass Flow Rate
  F Drive Frequency
  Fo Drive Frequency—nominal zero flow
  $\alpha_F$ Linear Frequency constant for zero
  $\alpha_m$ Coefficient related to FCF
  $\alpha_{mF}$ Linear frequency (temp) constant.

34. The method of claim 15 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([\,1 \quad (F-F_0) \quad \dot{m} \quad \dot{m}(F-F_0)\,])\Delta t \qquad 1.10$$

Where
  $\Delta t$ Flow induced time delay
  $\Delta t_0$ Nominal time delay
  $\dot{m}$ Mass Flow Rate
  F Drive Frequency
  Fo Drive Frequency—nominal zero flow
  $\alpha_F$ Linear Frequency constant for zero
  $\alpha_m$ Coefficient related to FCF
  $\alpha_{mF}$ Linear frequency (temp) constant.

35. The method of claim 15 wherein said step of determining said thermally compensated mass flow rate comprises the step of solving the expression:

$$\dot{m} = \frac{\Delta t - \Delta t_0 - (F - F_0)\alpha_F}{[\alpha_{\dot{m}} + (F - F_0)\alpha_{\dot{m}F}]} \qquad 1.5$$

Where:
  $\Delta t$ Flow induced time delay
  $\Delta t_0$ Nominal time delay
  $\dot{m}$ Mass Flow Rate
  F Drive Frequency
  $F_0$ zero drive frequency
  $\alpha_F$ Linear Frequency constant for zero
  $\alpha_m$ constant related to FCF
  $\alpha_{mF}$ Linear FCF frequency (temp) constant.

36. The method of claim 12 wherein said step of determining said thermally compensated mass flow rate comprises the step of solving the expression:

$$\dot{m} = \frac{\Delta t - \Delta t_0 - (F - F_0)\alpha_F}{[\alpha_{\dot{m}} + (F - F_0)\alpha_{\dot{m}F}]} \quad 1.5$$

Where:
Δt Flow induced time delay
$\Delta t_0$ Nominal time delay
$\dot{m}$ Mass Flow Rate
F Drive Frequency
$F_0$ zero drive frequency
$\alpha_F$ Linear Frequency constant for zero
$\alpha_m$ constant related to FCF
$\alpha_{mF}$ Linear FCF frequency (temp) constant.

37. The method of claim 13 wherein said step of determining said thermally compensated mass flow rate comprises the step of solving the expression:

$$\dot{m} = \frac{\Delta t - \Delta t_0 - (F - F_0)\alpha_F}{[\alpha_{\dot{m}} + (F - F_0)\alpha_{\dot{m}F}]} \quad 1.5$$

Where:
Δt Flow induced time delay
$\Delta t_0$ Nominal time delay
$\dot{m}$ Mass Flow Rate
F Drive Frequency
$F_0$ zero drive frequency
$\alpha_F$ Linear Frequency constant for zero
$\alpha_m$ constant related to FCF
$\alpha_{mF}$ Linear FCF frequency (temp) constant.

38. The method of claim 1 including the further step of determining a thermally compensated flow rate for said Coriolis flow meter in response to said generation of said first and second signals and said provision of said thermal compensation for said Coriolis flow meter.

39. The method of claim 38 including the further steps of:
determining a drive frequency F from said second signal;
deriving a linear frequency calibration constant $\alpha_F$ for zero; and
using said drive frequency F and said linear frequency calibration constant $\alpha_F$ for zero to derive said thermally compensated flow rate.

40. The method of claim 39 compensated mass flow rate including further steps of:
deriving a coefficient $\alpha_m$ for flow; and
using said drive frequency F and said linear drive frequency constant $\alpha_F$ for zero, and said constant $\alpha_m$ for flow to derive said thermally compensated flow rate.

41. The method of claim 40 including the further steps of:
deriving a linear frequency (temp) constant $\alpha_{mF}$ for flow; and
using said drive frequency F and said linear drive frequency constant $\alpha_F$ for zero and said constant $\alpha_m$ for flow and said linear frequency (temp) constant $\alpha_{mF}$ for flow to derive said thermally compensated mass flow rate.

42. The method of claim 41 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([\,1 \quad (F - F_0) \quad \dot{m} \quad \dot{m}(F - F_0)\,])\Delta t \quad 1.10$$

Where
Δt Flow induced time delay
$\Delta t_0$ Nominal time delay
$\dot{m}$ Mass Flow Rate
F Drive Frequency
Fo Drive Frequency—nominal zero flow
$\alpha_F$ Linear Frequency constant for zero
$\alpha_m$ Coefficient related to FCF
$\alpha_{mF}$ Linear frequency (temp) constant.

43. The method of claim 41 wherein said step of determining said thermally compensated mass flow rate comprises the step of solving the expression:

$$\dot{m} = \frac{\Delta t - \Delta t_0 - (F - F_0)\alpha_F}{[\alpha_{\dot{m}} + (F - F_0)\alpha_{\dot{m}F}]} \quad 1.5$$

Where:
Δt Flow induced time delay
$\Delta t_0$ Nominal time delay
$\dot{m}$ Mass Flow Rate
F Drive Frequency
$F_0$ zero drive frequency
$\alpha_F$ Linear Frequency constant for zero
$\alpha_m$ constant related to FCF
$\alpha_{mF}$ Linear FCF frequency (temp) constant.

44. The method of claim 40 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([\,1 \quad (F - F_0) \quad \dot{m} \quad \dot{m}(F - F_0)\,])\Delta t \quad 1.10$$

Where
Δt Flow induced time delay
$\Delta t_0$ Nominal time delay
$\dot{m}$ Mass Flow Rate
F Drive Frequency
Fo Drive Frequency—nominal zero flow
$\alpha_F$ Linear Frequency constant for zero
$\alpha_m$ Coefficient related to FCF
$\alpha_{mF}$ Linear frequency (temp) constant.

45. The method of claim 39 wherein said step of determining said thermally compensated mass flow rate comprises the step of solving the expression:

$$\dot{m} = \frac{\Delta t - \Delta t_0 - (F - F_0)\alpha_F}{[\alpha_{\dot{m}} + (F - F_0)\alpha_{\dot{m}F}]} \quad 1.5$$

Where:
Δt Flow induced time delay
$\Delta t_0$ Nominal time delay
$\dot{m}$ Mass Flow Rate F Drive Frequency
$F_0$ zero drive frequency
$\alpha_F$ Linear Frequency constant for zero
$\alpha_m$ constant related to FCF
$\alpha_{mF}$ Linear FCF frequency (temp) constant.

46. The method of claim 40 wherein said step of determining said thermally compensated mass flow rate comprises the step of solving the expression:

$$\dot{m} = \frac{\Delta t - \Delta t_0 - (F - F_0)\alpha_F}{[\alpha_{\dot{m}} + (F - F_0)\alpha_{\dot{m}F}]} \quad 1.5$$

Where:
$\Delta t$ Flow induced time delay
$\Delta t_0$ Nominal time delay
$\dot{m}$ Mass Flow Rate
F Drive Frequency
$F_0$ zero drive frequency
$\alpha_F$ Linear Frequency constant for zero
$\alpha_m$ constant related to FCF
$\alpha_{mF}$ Linear FCF frequency (temp) constant.

47. The method of claim 38 wherein said step of determining said thermally compensated mass flow rate comprises the step of solving the expression:

$$\dot{m} = \frac{\Delta t - \Delta t_0 - (F - F_0)\alpha_F}{[\alpha_{\dot{m}} + (F - F_0)\alpha_{\dot{m}F}]} \quad 1.5$$

Where:
$\Delta t$ Flow induced time delay
$\Delta t_0$ Nominal time delay
$\dot{m}$ Mass Flow Rate
F Drive Frequency
$F_0$ zero drive frequency
$\alpha_F$ Linear Frequency constant for zero
$\alpha_m$ constant related to FCF
$\alpha_{mF}$ Linear FCF frequency (temp) constant.

48. The method of claim 39 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([\,1 \quad (F - F_0) \quad \dot{m} \quad \dot{m}(F - F_0)\,])\Delta t \quad 1.10$$

Where
$\Delta t$ Flow induced time delay
$\Delta t_0$ Nominal time delay
$\dot{m}$ Mass Flow Rate
F Drive Frequency
Fo Drive Frequency—nominal zero flow
$\alpha_F$ Linear Frequency constant for zero
$\alpha_m$ Coefficient related to FCF
$\alpha_{mF}$ Linear frequency (temp) constant.

49. The method of claim 1 including the further steps of:
receiving a third signal representing calibration constants of said Coriolis flow meter; and
using said first and said second and said third signals and said calibration constants to determine a thermally compensated flow rate for said Coriolis flow meter.

50. The method of claim 49 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([\,1 \quad (F - F_0) \quad \dot{m} \quad \dot{m}(F - F_0)\,])\Delta t \quad 1.10$$

Where
$\Delta t$ Flow induced time delay
$\Delta t_0$ Nominal time delay
$\dot{m}$ Mass Flow Rate
F Drive Frequency
Fo Drive Frequency—nominal zero flow
$\alpha_F$ Linear Frequency constant for zero
$\alpha_m$ Coefficient related to FCF
$\alpha_{mF}$ Linear frequency (temp) constant.

51. The method of claim 49 wherein said step of determining said thermally compensated mass flow rate comprises the step of solving the expression:

$$\dot{m} = \frac{\Delta t - \Delta t_0 - (F - F_0)\alpha_F}{[\alpha_{\dot{m}} + (F - F_0)\alpha_{\dot{m}F}]} \quad 1.5$$

Where:
$\Delta t$ Flow induced time delay
$\Delta t_0$ Nominal time delay
$\dot{m}$ Mass Flow Rate
F Drive Frequency
$F_0$ zero drive frequency
$\alpha_F$ Linear Frequency constant for zero
$\alpha_m$ constant related to FCF
$\alpha_{mF}$ Linear FCF frequency (temp) constant.

52. The method of claim 38 wherein said step of deriving said calibration constants includes the step of solving the expression:

$$\begin{bmatrix} \Delta t_0 \\ \alpha_F \\ \alpha_{\dot{m}} \\ \alpha_{\dot{m}F} \end{bmatrix} = pinv([\,1 \quad (F - F_0) \quad \dot{m} \quad \dot{m}(F - F_0)\,])\Delta t \quad 1.10$$

Where
$\Delta t$ Flow induced time delay
$\Delta t_0$ Nominal time delay
$\dot{m}$ Mass Flow Rate
F Drive Frequency
Fo Drive Frequency—nominal zero flow
$\alpha_F$ Linear Frequency constant for zero
$\alpha_m$ Coefficient related to FCF
$\alpha_{mF}$ Linear frequency (temp) constant.

53. Apparatus that provides thermal compensation for a Coriolis flow meter having at least one flow tube; said apparatus comprises:
apparatus (1002) that generates a first signal representing Coriolis deflections of said flow tube;
apparatus (1004) that generates a second signal representing characteristics of said flow meter, wherein said characteristics include the drive frequency F of said Coriolis flow meter as well as an induced time delay $\Delta t$; and characterized by the provision of meter electronics (121) that uses said first and said second signals to provide thermal compensation for output signals of said Coriolis flow meter.

54. The apparatus of claim 53 wherein said apparatus that provides thermal compensation includes:
apparatus (1003) that receives a calibrated mass flow rate from a master Coriolis flow meter, and
apparatus (1006, 1106) that uses said first and said second signals and said calibrated mass flow rate to provide said thermal compensation for said Coriolis flow meter.

55. The apparatus of claim 54 wherein said apparatus that provides thermal compensation further includes:
apparatus (1006) that uses said first and said second signals and said calibrated mass flow rate to derive calibration constants for said Coriolis flow meter; and
apparatus (1106) that uses said calibration constants and said first and said second signals and said calibrated mass flow rate to provide said thermal compensation for said Coriolis flow meter.

56. The apparatus of claim 55 wherein said apparatus (1006) that derives said calibration constants comprises:
apparatus (1006) that receives a mass flow rate $\dot{m}$ from a master Coriolis flow meter;
apparatus (1006) that receives said second signal to derive a flow induced time delay $\Delta t$ and said drive frequency F of the Coriolis flow meter;
apparatus (1006) that derives a linear drive frequency constant $\alpha_F$ for a nominal time delay $\Delta t_0$; and
apparatus (1006) that uses said drive frequency F, and said linear drive frequency constant $\alpha_F$ for said nominal time delay $\Delta t_0$ and said mass flow rate $\dot{m}$ to derive said calibration constants.

57. The apparatus of claim 56 wherein said calibration constants are:

$$\Delta t_0, \alpha_F, \alpha_m, \alpha_{mF}.$$

58. The apparatus of claim 56 wherein said apparatus (1006) that derives said calibration constants includes apparatus that solves the expression:

$$\begin{bmatrix} \Delta t_0 \\ \alpha_F \\ \alpha_{\dot{m}} \\ \alpha_{\dot{m}F} \end{bmatrix} = pinv([1 (F - F_0) \; \dot{m} \; \dot{m}(F - F_0)]) \Delta t \qquad 1.10$$

Where
$\Delta t$ Flow induced time delay
$\Delta t_0$ Nominal time delay
$\dot{m}$ Mass Flow Rate
F Drive Frequency
Fo Drive Frequency—nominal zero flow
$\alpha_F$ Linear Frequency constant for zero
$\alpha_m$ Coefficient related to FCF
$\alpha_{mF}$ Linear frequency (temp) constant.

59. The apparatus of claim 55 wherein said calibration constants are:

$$\Delta t_0, \alpha_F, \alpha_m, \alpha_{mF}.$$

60. The apparatus of claim 55 including apparatus (1106) that determines a thermally compensated flow rate for said Coriolis flow meter in response to said generation of said first and second signals and said provision of said thermal compensation for said Coriolis flow meter.

61. The apparatus of claim 60 wherein said apparatus (1106) that derives said thermally compensated mass flow rate solves the expression $$\dot{m} = \frac{\Delta t - \Delta t_0 - (F - F_0)\alpha_F}{[\alpha_{\dot{m}} + (F - F_0)\alpha_{\dot{m}F}]} \qquad 1.5$$

Where:
$\Delta t$ Flow induced time delay
$\Delta t_0$ Nominal time delay
$\dot{m}$ Mass Flow Rate
F Drive Frequency
$\alpha_F$ Linear Frequency constant for zero
$\alpha_m$ constant related to FCF
$\alpha_{mF}$ Linear FCF frequency (temp) constant.

62. The apparatus of claim 54 including apparatus (1106) that determines a thermally compensated flow rate for said Coriolis flow meter in response to said generation of said first and second signals and said provision of said thermal compensation for said Coriolis flow meter.

63. The apparatus of claim 62 wherein said apparatus (1106) that derives said thermally compensated mass flow rate solves the expression $$\dot{m} = \frac{\Delta t - \Delta t_0 - (F - F_0)\alpha_F}{[\alpha_{\dot{m}} + (F - F_0)\alpha_{\dot{m}F}]} \qquad 1.5$$

Where:
$\Delta t$ Flow induced time delay
$\Delta t_0$ Nominal time delay
$\dot{m}$ Mass Flow Rate
F Drive Frequency
$\alpha_F$ Linear Frequency constant for zero
$\alpha_m$ constant related to FCF
$\alpha_{mF}$ Linear FCF frequency (temp) constant.

64. The apparatus of claim 53 including apparatus (1106) that determines a thermally compensated flow rate for said Coriolis flow meter in response to said generation of said first and second signals and said provision of said thermal compensation for said Coriolis flow meter.

65. The apparatus of claim 64 wherein said apparatus (1106) that derives said thermally compensated mass flow rate solves the expression $$\dot{m} = \frac{\Delta t - \Delta t_0 - (F - F_0)\alpha_F}{[\alpha_{\dot{m}} + (F - F_0)\alpha_{\dot{m}F}]} \qquad 1.5$$

Where:
$\Delta t$ Flow induced time delay
$\Delta t_0$ Nominal time delay
$\dot{m}$ Mass Flow Rate
F Drive Frequency
$\alpha_F$ Linear Frequency constant for zero
$\alpha_m$ constant related to FCF
$\alpha_{mF}$ Linear FCF frequency (temp) constant.

66. The apparatus of claim 53 further including:
apparatus (1106) that receives a third signal representing calibration constants of said Coriolis flow meter; and
apparatus that uses said first and said second and said third signals and said calibration constants to determine a thermally compensated flow rate for said Coriolis flow meter.

67. The apparatus of claim 66 wherein said apparatus (1006) that derives said calibration constants includes apparatus that solves the expression:

$$\begin{bmatrix} \Delta t_0 \\ \alpha_F \\ \alpha_{\dot{m}} \\ \alpha_{\dot{m}F} \end{bmatrix} = pinv([\,1\quad (F-F_0)\quad \dot{m}\quad \dot{m}(F-F_0)\,])\Delta t \qquad 1.10$$

Where
  $\Delta t$ Flow induced time delay
    $\Delta t_0$ Nominal time delay
    $\dot{m}$ Mass Flow Rate
    F Drive Frequency
  Fo Drive Frequency—nominal zero flow
  $\alpha_F$ Linear Frequency constant for zero
  $\alpha_m$ Coefficient related to FCF
  $\alpha_{\dot{m}F}$ Linear frequency (temp) constant.

68. The apparatus of claim 66 wherein said calibration constants are:

$\Delta t_0, \alpha_F, \alpha_m, \alpha_{\dot{m}F}$.

69. The apparatus of claim 53 further including:
apparatus (1004) that determines a drive frequency F from said second signal;
apparatus (1006) that derives a linear frequency calibration constant $\alpha_F$ for zero;
apparatus (1006) that derives a coefficient $\alpha_m$ for flow;
apparatus (1006) that derives a linear frequency (temp) constant $\alpha_{\dot{m}F}$ for flow; and
apparatus (1106) that uses said drive frequency F and said linear drive frequency constant $\alpha_F$ for zero and said constant $\alpha_m$ for flow and said linear frequency (temp) constant $\alpha_{\dot{m}F}$ for flow to derive a thermally compensated mass flow rate.

70. The apparatus of claim 69 wherein said apparatus (1106) that derives said thermally compensated mass flow rate solves the expression $$\dot{m} = \frac{\Delta t - \Delta t_0 - (F - F_0)\alpha_F}{[\alpha_{\dot{m}} + (F - F_0)\alpha_{\dot{m}F}]} \qquad 1.5$$

Where:
  $\Delta t$ Flow induced time delay
  $\Delta t_0$ Nominal time delay
  $\dot{m}$ Mass Flow Rate
  F Drive Frequency
  $\alpha_F$ Linear Frequency constant for zero
  $\alpha_m$ constant related to FCF
  $\alpha_{\dot{m}F}$ Linear FCF frequency (temp) constant.

* * * * *

UNITED STATES PATENT AND TRADEMARK OFFICE
CERTIFICATE OF CORRECTION

| | | |
|---|---|---|
| PATENT NO. | : 7,628,084 B2 | |
| APPLICATION NO. | : 11/575376 | |
| DATED | : December 8, 2009 | |
| INVENTOR(S) | : Martin Andrew et al. | |

It is certified that error appears in the above-identified patent and that said Letters Patent is hereby corrected as shown below:

At Column 4, lines 9, 11, 18 and 48; Column 5, lines 1, 19, 63 and 67; Column 6, lines 36 and 52; Column 7, lines 32 and 34; Column 9, line 27; Column 10, line 30; Column 11, lines 51 and 58; Column 12, lines 20, 47 and 58; Column 13, lines 6, 14, 16 and 66; Column 14, line 4; Column 16, lines 44 and 66; Column 17, lines 19, 23 and 43; Column 18, lines 8, 12, 14, 20, 43 and 61; Column 19, lines 10, 12, 18, 41, 59 and 63; Column 20, lines 17, 41 and 63; Column 21, lines 16, 33 and 51; Column 22, lines 2, 23, 44 and 63; Column 23, lines 15, 34, 52, 54 and 61; Column 24, lines 16, 34 and 53; Column 25, lines 4, 22, 39 and 60; Column 26, lines 19, 37 and 57; Column 27, lines 38, 57 and 62; Column 28, lines 16, 37 and 59; Column 29, lines 20 and 25; and Column 30, lines 3, 8 and 26, "$\alpha_m$", each occurrence, should read -- $\alpha_{\dot{m}}$ --.

At Column 4, lines 15, 19 and 48; Column 5, lines 2, 20 and 65; Column 6, lines 1, 37 and 53; Column 7, line 34; Column 11, lines 51 and 58; Column 12, lines 20, 47 and 59; Column 13, lines 6, 14, 16 and 66; Column 14, line 6; Column 16, lines 44 and 67; Column 17, lines 20, 23 and 44; Column 18, lines 9, 17, 21, 44 and 62; Column 19, lines 15, 19, 42, 60 and 63; Column 20, lines 18, 42 and 64: Column 21, lines 17, 34 and 52; Column 22, lines 3, 24, 45 and 64; Column 23, lines 16, 35, 57 and 62; Column 24, lines 17, 35 and 54; Column 25, lines 5, 23, 40 and 61; Column 26, lines 20, 38 and 58; Column 27, lines 38, 58 and 62; Column 28, lines 17, 38 and 60; Column 29, lines 21 and 25; and Column 30, lines 5, 9 and 27, "$\alpha_{mF}$", each occurrence, should read -- $\alpha_{\dot{m}F}$ --.

Column 7, line 48, replace "RP00" with --RP0--.

Column 10, line 30, Equation 1.5, that portion of the equation reading " $(\dot{m} - \dot{m})$ " should read -- $(\dot{m} - \dot{m}_0)$ --.

Signed and Sealed this
Thirtieth Day of October, 2012

David J. Kappos
*Director of the United States Patent and Trademark Office*